United States Patent
Evans et al.

(10) Patent No.: US 9,843,594 B1
(45) Date of Patent: Dec. 12, 2017

(54) SYSTEMS AND METHODS FOR DETECTING ANOMALOUS MESSAGES IN AUTOMOBILE NETWORKS

(71) Applicant: Symantec Corporation, Mountain View, CA (US)

(72) Inventors: Nathan Evans, Sterling, VA (US); Azzedine Benameur, Fairfax Station, VA (US); Yun Shen, Dublin (IE)

(73) Assignee: Symantec Corporation, Mountain View, CA (US)

( * ) Notice: Subject to any disclaimer, the term of this patent is extended or adjusted under 35 U.S.C. 154(b) by 471 days.

(21) Appl. No.: 14/525,792

(22) Filed: Oct. 28, 2014

(51) Int. Cl.
*G06F 21/00* (2013.01)
*H04L 29/06* (2006.01)

(52) U.S. Cl.
CPC ................................ *H04L 63/1408* (2013.01)

(58) Field of Classification Search
CPC .................................................. H04L 63/1408
See application file for complete search history.

(56) References Cited

U.S. PATENT DOCUMENTS

| | | | |
|---|---|---|---|
| 7,015,811 B2 | 3/2006 | Decker et al. | |
| 7,475,124 B2 | 1/2009 | Jiang et al. | |
| 7,673,074 B1 | 3/2010 | Sebastian et al. | |
| 7,861,300 B2 | 12/2010 | Arnold et al. | |
| 8,104,090 B1 | 1/2012 | Pavlyushchik | |
| 8,126,891 B2 | 2/2012 | Laxman et al. | |
| 8,341,745 B1 | 12/2012 | Chau et al. | |
| 8,544,087 B1 | 9/2013 | Eskin et al. | |
| 8,566,938 B1 | 10/2013 | Prakash et al. | |
| 8,925,037 B2 | 12/2014 | Marino et al. | |
| 8,973,133 B1 | 3/2015 | Cooley | |

(Continued)

FOREIGN PATENT DOCUMENTS

| | | |
|---|---|---|
| CN | 102571469 A | 7/2012 |
| CN | 102893289 A | 1/2013 |
| EP | 2515250 A1 | 10/2012 |

OTHER PUBLICATIONS

Mahoney, Network traffic anomaly detection based on packet bytes, Proceedings of the 2003 ACM symposium on Applied computing, pp. 346-350, Mar. 9, 2003.

(Continued)

*Primary Examiner* — Kendall Dolly
(74) *Attorney, Agent, or Firm* — FisherBroyles, LLP

(57) ABSTRACT

The disclosed computer-implemented method for detecting anomalous messages in automobile networks may include (1) receiving automobile-network messages that are expected to be broadcast over an automobile network of an automobile, (2) extracting a set of features from the automobile-network messages, and (3) using the set of features to create a model that is capable of distinguishing expected automobile-network messages from anomalous automobile-network messages. The disclosed computer-implemented method may further include (1) detecting an automobile-network message that has been broadcast over the automobile network, (2) using the model to determine that the automobile-network message is anomalous, and (3) performing a security action in response to determining that the automobile-network message is anomalous. Various other methods, systems, and computer-readable media are also disclosed.

20 Claims, 9 Drawing Sheets

(56) References Cited

U.S. PATENT DOCUMENTS

| | | | |
|---|---|---|---|
| 9,053,516 B2* | 6/2015 | Stempora | G06Q 40/08 |
| 9,088,560 B1 | 7/2015 | Newstadt et al. | |
| 9,141,790 B2 | 9/2015 | Roundy et al. | |
| 9,148,441 B1 | 9/2015 | Tamersoy et al. | |
| 9,166,997 B1 | 10/2015 | Guo et al. | |
| 9,256,739 B1 | 2/2016 | Roundy et al. | |
| 9,332,030 B1 | 5/2016 | Pereira | |
| 9,384,066 B1 | 7/2016 | Leita et al. | |
| 9,473,380 B1 | 10/2016 | Bermudez et al. | |
| 9,529,990 B2 | 12/2016 | Newstadt et al. | |
| 9,582,669 B1 | 2/2017 | Shen et al. | |
| 2004/0044771 A1 | 3/2004 | Allred et al. | |
| 2004/0059822 A1 | 3/2004 | Jiang et al. | |
| 2005/0030969 A1 | 2/2005 | Fredriksson | |
| 2005/0138413 A1 | 6/2005 | Lippmann et al. | |
| 2006/0095573 A1 | 5/2006 | Carle et al. | |
| 2006/0236374 A1 | 10/2006 | Hartman | |
| 2008/0134327 A1 | 6/2008 | Bharrat et al. | |
| 2009/0144308 A1 | 6/2009 | Huie et al. | |
| 2010/0186088 A1 | 7/2010 | Banerjee et al. | |
| 2010/0192226 A1 | 7/2010 | Noel et al. | |
| 2010/0235879 A1 | 9/2010 | Burnside et al. | |
| 2011/0019774 A1 | 1/2011 | Furuta | |
| 2011/0047620 A1 | 2/2011 | Mahaffey et al. | |
| 2011/0083180 A1 | 4/2011 | Mashevsky et al. | |
| 2011/0302656 A1 | 12/2011 | El-Moussa | |
| 2011/0314546 A1 | 12/2011 | Aziz et al. | |
| 2011/0320617 A1 | 12/2011 | Annamalaisami et al. | |
| 2012/0144468 A1 | 6/2012 | Pratt et al. | |
| 2012/0233683 A1 | 9/2012 | Ibrahim et al. | |
| 2013/0031037 A1 | 1/2013 | Brandt et al. | |
| 2013/0042294 A1 | 2/2013 | Colvin et al. | |
| 2013/0212659 A1 | 8/2013 | Maher et al. | |
| 2013/0333032 A1 | 12/2013 | Delatorre et al. | |
| 2014/0226664 A1 | 8/2014 | Chen et al. | |
| 2014/0258379 A1 | 9/2014 | L'Heureux et al. | |
| 2014/0365646 A1 | 12/2014 | Xiong | |
| 2015/0113638 A1* | 4/2015 | Valasek | H04L 63/1441 726/22 |
| 2015/0150124 A1* | 5/2015 | Zhang | H04L 63/1408 726/22 |
| 2015/0191135 A1* | 7/2015 | Ben Noon | B60R 16/023 726/22 |
| 2015/0261655 A1 | 9/2015 | Versteeg et al. | |
| 2015/0281047 A1 | 10/2015 | Raju et al. | |

OTHER PUBLICATIONS

Balthrop et al., Revisiting LISYS: Parameters and Normal Behavior, Proceedings of the 2002 Congress on Evolutionary Computation, pp. 1045-1050, May 12, 2002.

Lee et al., Data mining approaches for intrusion detection, Proceedings of the 7th conference on USENIX Security Symposium—vol. 7, p. 6, Jan. 26, 1998.

Clifton et al., Developing custom intrusion detection filters using data mining, MILCOM 2000. 21st Century Military Communications Conference Proceedings, vol. 1, pp. 440-443, Oct. 22, 2000.

Bloedorn et al., Data Mining for Improving Intrusion Detection, http://www.mitre.org/sites/default/files/pdf/bloedorn_spss.pdf, Sep. 18, 2015.

Lee et al., Information-theoretic measures for anomaly detection, 2001 IEEE Symposium on Security and Privacy, pp. 130-143, May 13, 2001.

Yang et al., Anomaly detection and diagnosis in grid environments, Proceedings of the 2007 ACM/IEEE conference on Supercomputing, p. 33, Nov. 10, 2007.

Wang et al., Anomalous Payload-Based Network Intrusion Detection, Seventh International Workshop on Recent Advances in Intrusion Detection, pp. 203-222, Sep. 15, 2004.

Dussel et al., Cyber-Critical Infrastructure Protection Using Real-Time Payload-Based Anomaly Detection, 4th International Workshop on Critical Information Infrastructures Security, pp. 85-97, Sep. 30, 2009.

Tongaonkar et al., Towards self adaptive network traffic classification, Computer Communications, vol. 56, pp. 35-46, Feb. 1, 2015.

Bermudez et al., Automatic protocol field inference for deeper protocol understanding, IFIP Networking Conference (IFIP Networking), 2015, pp. 1-9, May 20, 2015.

Taylor et al., Frequency-based anomaly detection for the automotive CAN bus, 2015 World Congress on Industrial Control Systems Security (WCICS), pp. 45-49, Dec. 14, 2015.

Theissler, Anomaly detection in recordings from in-vehicle networks.pdf, Big Data Applications and Principles, First International Workshop, BIGDAP 2014, Madrid, Spain, Sep. 11, 2014.

Adam Glick, et al.; Systems and Methods for User-Directed Malware Remediation; U.S. Appl. No. 13/419,360, filed Mar. 13, 2012.

Carey Nachenberg, et al.; Systems and Methods for Neutralizing File-Format-Specific Exploits Included Within Files Contained Within Electronic Communications; U.S. Appl. No. 13/418,332, filed Mar. 12, 2012.

Leylya Yumer, et al.; Systems and Methods for Analyzing Zero-Day Attacks; U.S. Appl. No. 13/901,977, filed May 24, 2013.

Kyumin Lee, et al.; Content-Driven Detection of Campaigns in Social Media; CIKM'11; Oct. 24-28, 2011; ACM; Glasgow, Scotland, UK; http://faculty.cs.tamu.edu/caverlee/pubs/lee11cikm.pdf, as accessed Aug. 8, 2013.

Monowar H. Bhuyan, et al.; AOCD: An Adaptive Outlier Based Coordinated Scan Detection Approach; International Journal of Network Security; Nov. 2012; pp. 339-351; vol. 14, No. 6; http://www.cs.uccs.edu/~jkalita/papers/2012/BhuyanMonowarIJNS2012.pdf, as accessed Aug. 8, 2013.

William Eberle, et al., Graph-based approaches to insider threat detection; CSIIRW '09 Proceedings of the 5th Annual Workshop on Cyber Security and Information Intelligence Research: Cyber Security and Information Intelligence Challenges and Strategies; 2009; Article No. 44; ACM; http://dl.acm.org/citation.cfm?id=1558658, as accessed Aug. 8, 2013.

Splunk, Inc.; Detecting Advanced Persistent Threats—Using Splunk for APT; Jan. 4, 2012; Tech Brief; http://www.splunk.com/web.assets/pdfs/secure/Splunk_for_APT_Tech_Brief.pdf, as accessed Aug. 8, 2013.

Triumfant, Inc.; Detecting the Advanced Persistent Threat; Nov. 30, 2010; www.triumfant.com/advanced_persistent_threat.asp, as accessed Aug. 8, 2013.

EMC Corporation; Advanced Persistent Threat (APT) and Rootkit Detection; 2012; http://www.siliciumsecurity.com/advanced-persistent-threats-and-rootkits-detection/, as accessed Aug. 8, 2013.

Fanglu Guo, et al; Systems and Methods for Reducing False Positives When Using Event-Correlation Graphs to Detect Attacks on Computing Systems; U.S. Appl. No. 14/031,044, filed Sep. 19, 2013.

Colombe, Jeffrey B., et al., "Statistical profiling and visualization for detection of malicious insider attacks on computer networks", http://dl.acm.org/citation.cfm?id=1029231, as accessed Nov. 13, 2013, VizSEC/DMSEC '04 Proceedings of the 2004 ACM workshop on Visualization and data mining for computer security, ACM, New York, NY, (2004), 138-142.

Wang, Wei et al., "Diffusion and graph spectral methods for network forensic analysis", http://dl.acm.org/citation.cfm?id=1278956, as accessed Nov. 13, 2013, NSPW '06 Proceedings of the 2006 workshop on New security paradigms, ACM, New York, NY, (2006), 99-106.

Julisch, Klaus "Clustering intrusion detection alarms to support root cause analysis", http://dl.acm.org/citation.cfm?id=950192, as accessed Nov. 13, 2013, ACM Transactions on Information and System Security (TISSEC), vol. 6, Issue 4, ACM, New York, NY, (Nov. 2003), 443-471.

Treinen, James J., et al., "A framework for the application of association rule mining in large intrusion detection infrastructures", http://dl.acm.org/citation.cfm?id=2166375, as accessed Nov. 13, 2013, RAID'06 Proceedings of the 9th international conference on Recent Advances in Intrusion Detection, Springer-Verlag Berlin, Heidelberg, (2006), 1-18.

Gu, Guofei et al., "BotHunter: detecting malware infection through IDS-driven dialog correlation", http://dl.acm.org/citation.cfm?id=1362915, as accessed Nov. 13, 2013, SS'07 Proceedings of

(56) References Cited

OTHER PUBLICATIONS

16th USENIX Security Symposium on USENIX Security Symposium, Article No. 12, USENIX Association, Berkeley, CA, (2007).
Valdes, Alfonso et al., "Probabilistic Alert Correlation", http://dl.acm.org/citation.cfm?id=670734, as accessed Nov. 13, 2013, RAID '00 Proceedings of the 4th International Symposium on Recent Advances in Intrusion Detection, Springer-Verlag, London, UK, (2001), 54-68.
Alsubhi, Khalid et al., "FuzMet: a fuzzy-logic based alert prioritization engine for intrusion detection systems", http://dl.acm.org/citation.cfm?id=2344711, as accessed Nov. 13, 2013, International Journal of Network Management, vol. 22 Issue 4, John Wiley & Sons, Inc., New York, NY, (Jul. 2012).
Zamlot, Loai et al., "Prioritizing intrusion analysis using Dempster-Shafer theory", http://dl.acm.org/citation.cfm?id=2046694, as accessed Nov. 13, 2013, AISec '11 Proceedings of the 4th ACM workshop on Security and artificial intelligence, ACM, New York, NY, (2011), 59-70.
Oliner, Adam J., et al., "Community epidemic detection using time-correlated anomalies", http://dl.acm.org/citation.cfm?id=1894191, as accessed Nov. 13, 2013, Raid'10 Proceedings of the 13th international conference on Recent advances in intrusion detection, Springer-Verlag Berlin, Heidelberg, (2010), 360-381.
Ning, Peng et al., "Constructing attack scenarios through correlation of intrusion alerts", http://reeves-students.csc.ncsu.eduipapers-and-other-stuff/2002-10-ccs-constructing-attack-scenarios-paper.pdf, as accessed Nov. 13, 2013, CCS '02 Proceedings of the 9th ACM conference on Computer and communications security, ACM, Washington, DC, (Nov. 18-22, 2002), 245-254.
Wang, Wei et al., "A Graph Based Approach Toward Network Forensics Analysis", http://dl.acm.org/citation.cfm?id=1410238, as accessed Nov. 13, 2013, ACM Transactions on Information and System Security (TISSEC), vol. 12, Issue 1, Article No. 4, ACM, New York, NY, (Oct. 2008).
Valeur, Fredrik et al., "A Comprehensive Approach to Intrusion Detection Alert Correlation", http://dl.acm.org/citation.cfm?id=1038251, as accessed Nov. 13, 2013, IEEE Transactions on Dependable and Secure Computing, vol. 1, Issue 3, IEEE Computer Society Press, Los Alamitos, CA, (Jul. 2004), 146-169.
Tedesco, Gianni et al., "Real-Time Alert Correlation with Type Graphs", http://dl.acm.org/citation.cfm?id=1496279, as accessed Nov. 13, 2013, ICISS '08 Proceedings of the 4th International Conference on Information Systems Security, Springer-Verlag Berlin, Heidelberg, (2008), 173-187.
Wang, Wei et al., "Network Forensics Analysis with Evidence Graphs", http://www.dfrws.org/2005/proceedings/wang_evidencegraphs.pdf, as accessed Nov. 13, 2013, 2005 Digital Forensic Research Workshop (DFRWS), New Orleans, LA, (2005).
Wang, Ting et al., "Microscopic Social Influence", http://www.cc.gatech.edu/~lingliu/papers/2012/TingWang-SDM2012.pdf, as accessed Nov. 13, 2013, SDM 2012, (2012).
Ugander, Johan et al., "Balanced Label Propagation for Partitioning Massive Graphs", https://people.cam.cornell.edu/~jugander/papers/wsdm13-blp.pdf, as accessed Nov. 13, 2013, WSDM'13, ACM, Rome, Italy, (Feb. 4-8, 2013).
Ayday, Erman et al., "Iterative Trust and Reputation Management Using Belief Propagation", http://www.ece.gatech.edu/research/labs/WCCL/BP_publications/BP-ITRM-journal.pdf, as accessed Nov. 13, 2013, IEEE Transactions on Dependable and Secure Computing, vol. 9, No. 3, IEEE Computer Society, (May/Jun. 2012), 375-386.
Bruce McCorkendale, et al; Systems and Methods for Detecting Malware; U.S. Appl. No. 13/422,702, filed Mar. 16, 2012.
Acar Tamersoy, et al; Systems and Methods for Adjusting Suspiciousness Scores in Event-Correlation Graphs; U.S. Appl. No. 14/138,891, filed Dec. 23, 2013.
Paleari, Roberto et al., "Automatic Generation of Remediation Procedures for Malware Infections", https://www.usenix.org/legacy/event/sec10/tech/full_papers/Paleari.pdf, as accessed Feb. 6, 2014, USENIX Security'10 Proceedings of the 19th USENIX conference on Security, USENIX Association, Berkeley, CA, (2010).
"Combating Advanced Persistent Threats—How to prevent, detect, and remediate APTs", http://www.mcafee.com/us/resources/white-papers/wp-combat-advanced-persist-threats.pdf, as accessed Feb. 6, 2014, McAfee, Inc., Santa Clara, CA, (2011).
"Advanced Persistent Threat (APT) Attack & Zero-Day Protection", http://www.fireeye.com/, as accessed Feb. 6, 2014, FireEye, Inc., (2006).
"Advanced Threat Defense", http://www.fidelissecurity.com/advanced-persistent-threat-protection, as accessed Feb. 6, 2014, General Dynamics Fidelis Cybersecurity Solutions, Inc., (2013).
"Mandiant for Security Operations", https://www.mandiant.com/products/mandiant-platform/security-operations, as accessed Feb. 6, 2014, Mandiant, A FireEye Company, (Mar. 1, 2013).
"Mandiant for Intelligent Response", http://www.mandiant.com/products/mandiant-platform/intelligent-response, as accessed Feb. 6, 2014, Mandiant, A FireEye Company, (Mar. 1, 2013).
"Solera Networks Inc.", http://www.soleranetworks.com/, as accessed Feb. 6, 2014, (Feb. 16, 2005).
"LogRhythm, Inc.", http://www.logrhythm.com/, as accessed Feb. 6, 2014, (Oct. 18, 2000).
Kevin Alejandro Roundy, et al; Systems and Methods for Using Event-Correlation Graphs to Generate Remediation Procedures; U.S. Appl. No. 14/221,703, filed Mar. 21, 2014.
Eberle, William et al., "Insider Threat Detection Using Graph-Bases Approaches", http://www.eecs.wsu.edu/-holder/pubs/EberleCATCH09.pdf, Cybersecurity Applications & Technology Conference for Homeland Security, (Jan. 2009).
Constantin, Lucian, "Attackers used known exploit to steal customer log-in credentials, vBulletin maker says", http://www.networkworid.com/article/2171967/access-control/attackers-used-known-exploit-to-steal-customer-log-in-credentials--vbulletin-maker-sa.html, IDG News Service, Network World, (Nov. 18, 2013).
"Recovery Manager for Active Directory Forest Edition", http://software.dell.com/documents/recovery-manager-for-active-directory-forest-edition-datasheet-26622.pdf, Dell, Inc., (Nov. 2013).
Scarfone, Karen et al., "Guide to Intrusion Detection and Prevention Systems (IDPS)", http://csrc.nist.gov/publications/nistpubs/800-94/SP800-94, National Institute of Standards and Technology, Special Publication 800-94, (Feb. 2007).
Dezert, Jean et al., "On the Validity of Dempster-Shafer Theory", Fusion 2012—15th International Conference on Information Fusion, Singapour, Singapore, (Jul. 2012).
Kevin Roundy, et al; Systems and Methods for Using Event-Correlation Graphs to Detect Attacks on Computing Systems; U.S. Appl. No. 14/041,762, filed Sep. 30, 2013.
Ilya Sokolov, et al; Systems and Methods for Notifying Contacts About the Status of Persons Impacted by Significant Unforeseen Events; U.S. Appl. No. 14/525,244, filed Oct. 28, 2014.
"Google now", http://www.google.com/landing/now/#whatisit, as accessed Aug. 28, 2014, (Jun. 28, 2012).
"Bing Maps", http://www.bing.com/maps/, as accessed Aug. 28, 2014, (Jun. 11, 2009).
"Google Now", https://plus.google.com/+google/posts/WhNRboMLynU, as accessed Aug. 18, 2015, (Mar. 29, 2014).
Keith Newstadt, et al; Systems and Methods for Validating Login Attempts Based on User Location; U.S. Appl. No. 14/197,687, filed Mar. 5, 2014.
Keith Newstadt; Systems and Methods for Validating Login Attempts Based on User Location; U.S. Appl. No. 14/735,195, filed Jun. 10, 2015.
Michael Shavell, et al; Systems and Methods for Storing Information About Transmission Control Protocol Connections; U.S. Appl. No. 14/314,263, filed Jun. 25, 2014.
Haas, Juergen; Syn flood; http://linux.about.com/cs/linux101/g/synflood.htm, as accessed Jul. 10, 2014; About.com.
Shane Pereira; Systems and Methods for Thwarting Illegitimate Initialization Attempts; U.S. Appl. No. 14/485,287, filed Sep. 12, 2014.

(56) References Cited

OTHER PUBLICATIONS

Hobgood, et al., Advanced Automatic Crash Notifications and, Urgency Factors: Can We Standardize?, APCO 2011, PowerPoint Slides, Jul. 22, 2012.
Asi, et al., Black Box System Design, Dec. 14, 2010.
Ignacio Bermudez Corrales, et al; Systems and Methods for Identifying Compromised Devices Within Industrial Control Systems; U.S. Appl. No. 14/952,344, filed Nov. 25, 2015.
Bolzoni; Poseidon: a 2-tier Anomaly-based Intrusion Detection System; http://doc.utwente.nl/54544/1/00000150.pdf, as accessed Sep. 29, 2015; International Workshop on Information Assurance, IEEE, London.
Caselli; Sequence-aware Intrusion Detection in Industrial Control Systems; CPSS'15, Proceedings of the 1st ACM Workshop on Cyber-Physical System Security, 2015.
Cisco Anomaly Guard Module; http://www.cisco.com/c/en/us/products/collateral/interfaces-modules/catalyst-6500-7600-router-anomaly-guard-module/product_data_sheet0900aecd80220a7c. html, as accessed Sep. 29, 2015; Document ID1457308823644728.
Distributed control system; https://en.wikipedia.org/wiki/Distributed_control_system, as accessed Sep. 29, 2015; Wikipedia.
Garitano; A Review of SCADA Anomaly Detection Systems; Advances in Intelligent and Soft Computing, 2016.
Ginter; Experience with Network Anomaly Detection on Industrial Networks; Industrial Control Systems Joint Working Group (ICSJWG), 2010.
Hadziosmanovi; N-Gram against the Machine: on the Feasibility of the N-Gram Network Analysis for Binary Protocols; Research in Attacks, Intrusions, and Defenses. 2012.
Kiss; Data Clustering-based Anomaly Detection in Industrial Control Systems; Intelligent Computer Communication and Processing, IEEE. 2014.
Mahoney; Phad: Packet Header Anomaly Detection for Identifying Hostile Network Traffic; https://cs.fit.edu/~mmahoney/paper3.pdf, as accessed Sep. 29, 2015.
Mantere; Network Traffic Features for Anomaly Detection in Specific Industrial Control System Network; Future Internet 2013, vol. 5 (6), MDPI.
Perdisci; McPad : A Multiple Classifier System for Accurate Payload-based Anomaly Detection; https://pralab.diee.unica.it/sites/default/files/Perdisci_COMNET2009.pdf, as accessed Sep. 29, 2015; Computer Networks, vol. 53, Issue 6.
Snort (software); https://en.wikipedia.org/wiki/Snort_(software), as accessed Sep. 29, 2015; Wikipedia.
The Bro Network Security Monitor; https://www.bro.org/, as accessed Sep. 29, 2015.
Wang; Anagram: A Content Anomaly Detector Resistant to Mimicry Attack; https://mice.cs.columbia.edu/getTechreport.php?techreportID=403&format=pdf&, as accessed Sep. 29, 2015; Recent Advances in Intrusion Detection.
Wang; Anomalous Payload-based Network Intrusion Detection; http://www.covert.io/research-papers/security/PAYL%20-%20Anomalous%20Payload-based%20Network%20Intrusion%20Detection.pdf, as accessed Sep. 29, 2015; Recent Advances in Intrusion Detection.
Walter Bogorad; Systems and Methods for Detecting Anomalies That are Potentially Indicative of Malicious Attacks; U.S. Appl. No. 15/059,326, filed Mar. 3, 2016.
Aggarwal; Outlier Analysis; http://www.springer.com/us/book/9781461463955, as accessed Feb. 1, 2016, (2013).
Dunning; Practical Machine Learning: A New Look at Anomaly Detection; https://www.maprcom/practical-machine-learning-new-look-anomaly-detection, as accessed Feb. 1, 2016, (Jul. 21, 2014).
Kind; Histogram-based traffic anomaly detection; http://ieeexplore.ieee.org/document/5374831/?arnumber=5374831, as accessed Feb. 1, 2016; IEEE Transactions on Network and Service Management, vol. 6, Issue 2, (Jun. 2009).
Wang; Network anomaly detection: A survey and comparative analysis of stochastic and deterministic methods; http://ieeexplore.ieee.org/document/6759879/?arnumber=6759879, as accessed Feb. 1, 2016; 2013 IEEE 52nd Annual Conference on Decision and Control (CDC), (Dec. 10-13, 2013).
Yolacan; Learning From Sequential Data for Anomaly Detection; https://repository.library.northeastern.edu/downloads/neu:349795, as accessed Feb. 1, 2016; Dissertation, (Oct. 2014).
Michael Sylvester Pukish, et al; Systems and Methods for Detecting Obscure Cyclic Application-Layer Message Sequences in Transport-Layer Message Sequences; U.S. Appl. No. 15/271,494, filed Sep. 21, 2016.
K. Nyalkalkar et al., "A comparative study of two network-based anomaly detection methods," in 2011 Proceedings IEEE INFOCOM, 2011.
S. Sinha et al., "WIND: Workload-Aware INtrusion Detection," in Recent Advances in Intrusion Detection, D. Zamboni and C. Kruegel, Eds. Springer Berlin Heidelberg, 2006.
L. Huang et al., "In-network PCA and anomaly detection," in in NIPS, 2006.
N. Goldenberg et al., "Accurate modeling of Modbus/TCP for intrusion detection in SCADA systems," Int. J. Crit. Infrastruct. Prot., vol. 6, No. 2, Jun. 2013.
M.-K. Yoon et al., "Communication Pattern Monitoring: Improving the Utility of Anomaly Detection for Industrial Control Systems," in Internet Society, San Diego, CA, USA, 2014.
N. Borisov et al., "Generic Application-Level Protocol Analyzer and its Language," Microsoft Research, MSR-TR-2005-133, Feb. 2005.
Zhipeng Zhao et al.; Systems and Methods for Identifying Message Payload Bit Fields in Electronic Communications; U.S. Appl. No. 15/359,076, filed Nov. 22, 2016.
"Transmission Control Protocol", http://en.wikipedia.org/wiki/Transmission_Control_Protocol, as accessed Jul. 10, 2014, Wikipedia, (Dec. 18, 2003).
A. Greenberg, "Hackers Remotely Kill a Jeep on the Highway—With Me in It," WIRED, Jul. 21, 2015. [Online]. Available: http://www.wired.com/2015/07/hackers-remotely-kill-jeep-highway/. [Accessed: Mar. 30, 2016].
Bajpai, et al; Systems and Methods for Detecting Suspicious Microcontroller Messages; U.S. Appl. No. 15/143,284, filed Apr. 29, 2016.
Michael Pukish, et al; Systems and Methods for Detecting Transactional Message Sequences That are Obscured in Multicast Communications; U.S. Appl. No. 15/194,337, filed Jun. 27, 2016.
Yun Shen, et al; Systems and Methods for Detecting Discrepancies in Automobile-Network Data; U.S. Appl. No. 14/525,715, filed Oct. 28, 2014.
Nathan Evans, et al; Systems and Methods for Evaluating Electronic Control Units Within Vehicle Emulations; U.S. Appl. No. 14/671,036, filed Mar. 27, 2015.
"Volvo tests Cloud-based V2V ice warning concept", http://telematicsnews.info/2014/03/19/volvo-tests-cloud-based-v2v-ice-warning-sharing_m5202/, as accessed Aug. 29, 2014, Telematics News, (Mar. 19, 2014).
"EMI/ESD Protection Solutions for the CAN Bus", http://www.onsemi.com/pub_link/Collateral/AND8169-D.PDF, as accessed Aug. 29, 2014, Publication Order No. AND8169/D, on Semiconductor, Semiconductor Components Industries, LLC, (Jun. 2014—Rev. 2).
Lepkowski, J. et al., "EMI/ESD protection solutions for the CAN bus", http://www.can-cia.org/fileadmin/cia/files/icc/10/cia_paper_lepkowski.pdf, as accessed Aug. 29, 2014, iCC 2005, CAN in Automation, (2005).
Wolf, Marko et al., "Security in Automotive Bus Systems", http://www.weika.eu/papers/WolfEtAl_SecureBus.pdf, as accessed Aug. 29, 2014, (2004).
Kleberger, Pierre et al., "Security Aspects of the In-Vehicle Network in the Connected Car", Intelligent Vehicles Symposium (IV), 2011 IEEE, Baden-Baden, Germany, (Jun. 5-9, 2011), pp. 528-533.
Ben Othmane, Lotfi et al., "Towards Extended Safety in Connected Vehicles", Proceedings of the 16th International IEEE Annual Conference on Intelligent Transportation Systems (ITSC 2013), The Hague, The Netherlands, (Oct. 6-9, 2013).

(56) References Cited

OTHER PUBLICATIONS

Muter, M. et al., "A structured approach to anomaly detection for in-vehicle networks", 2010 Sixth International Conference on Information Assurance and Security (IAS), Atlanta, GA, (Aug. 23-25, 2010), pp. 92-98.

Muter, M. et al., "Entropy-based anomaly detection for in-vehicle networks", 2011 IEEE Intelligent Vehicles Symposium (IV), DOI: 10.1109/IVS.2011.5940552, Baden-Baden, Germany, (Jun. 5-9, 2011), pp. 1110-1115.

"Driver Feedback™", https://play.google.com/store/apps/details?id=com.statefarm.driverfeedback, as accessed Aug. 29, 2014, State Farm Insurance, Android Apps on Google Play, (Jun. 2, 2013).

"Controller Area Network (CAN) Overview", http://www.ni.com/white-paper/2732/en/, as accessed Aug. 29, 2014, National Instruments Corporation, (Aug. 1, 2014).

"CAN protocol specification", http://www.can-cia.org/index.php?id=164, as accessed Aug. 29, 2014, (Oct. 17, 2010).

"FlexRay Automotive Communication Bus Overview", http://www.ni.com/white-paper/3352/en/, as accessed Aug. 29, 2014, National Instruments Corporation, (Aug. 21, 2009).

"Snapshot®", https://www.progressive.com/auto/snapshot/, as accessed Aug. 29, 2014, Progressive Casualty Insurance Company, (Mar. 8, 2013).

"Bourns® Type 6002 Non-contacting Steering Angle Sensor", http://www.we-conect.com/cms/media/uploads/events/415/dokumente/Bourns_-_Non-Contacting Steering Angle Sensor Type 6002.pdf, as accessed Aug. 29, 2014, (on or before Aug. 29, 2014).

Miller, Charlie et al., "A Survey of Remote Automotive Attack Surfaces", http://www.ioactive.com/pdfs/Remote_Automotive_Attack_Surfaces.pdf, as accessed Aug. 29, 2014, Black Hat USA 2014, Las Vegas, NV, (Aug. 2-7, 2014).

Regev, Alon et al., "Automotive Ethernet Security Testing", http://standards.ieee.org/events/automotive/2014/20_Automotive_Ethernet_Security_Testing.pdf, as accessed Feb. 9, 2015, (2014).

Koscher, Karl et al., "Experimental Security Analysis of a Modern Automobile", http://www.autosec.org/pubs/cars-oakland2010.pdf, as accessed Feb. 9, 2015, 2010 IEEE Symposium on Security and Privacy, (2010).

Bayer, Stephanie et al., "Automotive Security Testing—The Digital Crash Test", http://www.sia.fr/images/images/Image/Evenements/2014/CESA/available%20papers/09_Bayer_Escrypt.pdf, as accessed Feb. 9, 2015, 3rd CESA Automotive Electronics Congress (CESA 3.0), Paris, France, (Dec. 3-4, 2014).

"Electronic control unit", https://en.wikipedia.org/wiki/Electronic_control_unit, as accessed Feb. 9, 2015, Wikipedia, (Jul. 28, 2004).

"Vehicle bus", https://en.wikipedia.org/wiki/Vehicle_bus, as accessed Feb. 9, 2015, Wikipedia, (May 12, 2005).

"Hardware emulation", https://en.wikipedia.org/wiki/Hardware_emulation, as accessed Feb. 9, 2015, Wikipedia, (Sep. 13, 2006).

"Emulation", https://en.wikipedia.org/wiki/Emulation, as accessed Feb. 9, 2015, Wikipedia, (Dec. 3, 2003).

Balthrop et al,, Revisiting LISYS: Parameters and Normal Behavior, Proceedings of the 2002, Congress on Evolutionary Computation, pp. 1045-1050, May 12, 2002.

Clifton et al., Developing custom intrusion detection filters using data mining, MILCOM 2000, 21st Century Military Communications Conference Proceedings, vol. 1, pp. 440-443, Oct. 22, 2000.

Bloedorn et al., Data Mining for Improving Intrusion Detection, http://www.mitre.org/sites/defaultifiles/pdf/bloedorn_spss.pdf, Sep. 18, 2015.

Bermudez et al,, Automatic protocol field inference for deeper protocol understanding, IFIP Networking Conference (IFIP Networking), 2015, pp. 1-9, May 20, 2015.

Pukish et al., U.S. Appl. No. 15/194,337, filed Jun. 27, 2016.

Taylor et al., Frequency-based anomaly detection for the automotive CAN bus, 2015.

Vishal Bajpai et al.; System and Method for Identifying an Invalid Packet on a Controller Area Network (CAN) Bus; U.S. Appl. No. 15/056,864, filed Feb. 29, 2016

Muter et al., A structured approach to anomaly detection for in-vehicle networks, 2010 Sixth International Conference on Information Assurance and Security (IAS), pp. 92-98, Aug. 23, 2010.

Steven Noel et al., "Correlating Intrusion Events and Building Attack Scenarios Through Attack Graph Distances", Computer Security Applications Conference, 2004. $20^{th}$ Annual Tucson, AZ, USA Dec. 6-10, 2004, (Dec. 10, 2004), pp. 350-359.

Extending schedulability analysis of Controller Area Network (CAN) for mixed (periodic/sporadic) messages (http://ieeexplore.ieee.org/document/6059010/); Sep. 5, 2011.

A structured approach to anomaly detection for in-vehicle networks (http://ieeexplore.ieee.ordstamp/stamp.jsp?arnumber=5604050); Aug. 23, 2010.

Intrusion Detection Systems (IDS) Part 2—Classification; methods; techniques (http://www.windowsecurity.com/articles-tutorials/intrusion . . . detection/IDS-Part2-Classification-methods-techniques.html); Jun. 15, 2014.

Vishal Bajpai et al.; System and Method for Identifying an Invalid Packet on a Controller Area Network (CAN) Bus; U.S. Appl. No. 15/056,864, filed Feb. 29, 2016.

Vishal Bajpai et al.; Systems and Methods for Identifying Suspicious Controller Area Network Messages; U.S. Appl.No. 15/587,762, filed May 5, 2017.

* cited by examiner

SYSTEMS AND METHODS FOR DETECTING ANOMALOUS MESSAGES IN AUTOMOBILE NETWORKS

BACKGROUND

Most modern automobiles operate via the correct functioning of various discrete electronic control units (ECUs), sensors, and/or actuators that communicate over one or more in-vehicle automobile networks (e.g., Controller Area Networks (CANs) and FlexRay Networks). Traditional automobile networks have been broadcast networks, and traditional automobile-network messages have generally not included source or destination addresses. Instead of using source or destination addresses, transmitting nodes have generally used unique identifiers to label the automobile-network messages that they broadcast and the data that the messages contain. As such, each node that is connected to a traditional automobile network will generally (1) receive each automobile-network message that is broadcast over the automobile network and (2) be required to decide whether to act upon or ignore the received messages based on the messages' identifiers.

Traditionally, automobile-network nodes have been designed to trust the automobile-network messages that they receive. However in recent years, researchers and malicious attackers have begun to find various ways to cause an automobile to perform unexpected and/or undesired actions by (1) connecting to the automobile's automobile networks (e.g., via a diagnostic port located under the dash of the automobile or a compromised automobile-network node that has wireless communication capabilities) and by broadcasting malicious automobile-network messages over the automobile network. For example, by broadcasting malicious automobile-network messages over an automobile's automobile network, an attacker may be able to cause the automobile to misreport its speed, apply its brakes, turn its steering wheel, or even shut down. Accordingly, the instant disclosure identifies and addresses a need for additional and improved systems and methods for detecting anomalous messages in automobile networks.

SUMMARY

As will be described in greater detail below, the instant disclosure describes various systems and methods for detecting anomalous messages in automobile networks. In one example, a computer-implemented method for detecting anomalous messages in automobile networks may include (1) receiving automobile-network messages that are expected to be broadcast over an automobile network of an automobile, (2) extracting a set of features from the automobile-network messages, and (3) using the set of features to create a model that is capable of distinguishing expected automobile-network messages from anomalous automobile-network messages. In some embodiments, the computer-implemented method may further include (1) detecting an automobile-network message that has been broadcast over the automobile network, (2) using the model to determine that the automobile-network message is anomalous, and (3) performing a security action in response to determining that the automobile-network message is anomalous.

In some embodiments, the step of using the set of features to create the model may include (1) creating two or more classifiers and (2) training each of the classifiers using a distinct subset of the set of features, and the step of using the model to determine that the automobile-network message is anomalous may include (1) calculating an aggregate classification for the automobile-network message based on a classification of the automobile-network message by each of the classifiers and (2) determining that the aggregate classification of the automobile-network message indicates that the automobile-network message is anomalous. In some embodiments, the classifiers may be created and trained using an ensemble machine-learning method.

In some embodiments, the step of receiving the automobile-network messages may include logging the automobile-network messages as they are broadcast over the automobile network, and the step of logging the automobile-network messages may be performed by an electronic control unit that is connected to the automobile network and/or a logging device that is connected to the automobile network via a port of the automobile network.

In some embodiments, a portion of the automobile-network messages may be broadcast over the automobile network and logged by a logging device connected to the automobile network, and an additional portion of the automobile-network messages may be broadcast over an additional automobile network of an additional automobile and logged by an additional logging device connected to the additional automobile network. In at least one embodiment, the step of receiving the automobile-network messages may include (1) receiving, at a cloud-based computing system, the portion of the automobile-network messages from the logging device and (2) receiving, at the cloud-based computing system, the additional portion of the automobile-network messages from the additional logging device, and the step of using the set of features to create the model may be performed at the cloud-based computing system.

In some embodiments, the step of using the set of features to create the model may include using the set of features to create a model that is capable of distinguishing automobile-network messages that are part of normal operation of the automobile from automobile-network messages that are part of an attack on the automobile network.

In some embodiments, the step of using the set of features to create the model may include using the set of features to create a model that is capable of distinguishing automobile-network messages of functioning electronic control units from automobile-network messages of malfunctioning electronic control units.

In some embodiments, the automobile-network messages may convey states of an attribute of the automobile, the states may represent a range of possible states of the attribute, and the step of using the features to create the model may include using the features to create a model that is capable of distinguishing automobile-network messages that convey states of the attribute that are within the range from automobile-network messages that convey states of the attribute that are outside of the range.

In some embodiments, the automobile-network messages may convey states of an attribute of the automobile while an additional attribute of the automobile is in a particular state, the states may represent a range of possible states of the attribute while the additional attribute of the automobile is in the particular state, and the step of using the features to create the model may include using the features to create a model that is capable of distinguishing automobile-network messages that convey states of the attribute that are within the range from automobile-network messages that convey states of the attribute that are outside of the range. In some embodiments, the automobile network may include an in-vehicle controller area network bus (e.g., a CAN bus).

In one embodiment, a system for implementing the above-described method may include (1) a receiving module, stored in memory, that receives automobile-network messages that are expected to be broadcast over an automobile network of an automobile, (2) an extracting module, stored in memory, that extracts a set of features from the automobile-network messages, (3) a creating module, stored in memory, that uses the set of features to create a model that is capable of distinguishing expected automobile-network messages from anomalous automobile-network messages, and (4) at least one processor that executes the receiving module, the extracting module, and the creating module. In some embodiments, the system may further include (1) a detecting module, stored in memory, that detects an automobile-network message that has been broadcast over the automobile network, (2) a determining module, stored in memory, that uses the model to determine that the automobile-network message is anomalous, and (3) a security module, stored in memory, that performs a security action in response to determining that the automobile-network message is anomalous.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) receive automobile-network messages that are expected to be broadcast over an automobile network of an automobile, (2) extract a set of features from the automobile-network messages, and (3) use the set of features to create a model that is capable of distinguishing expected automobile-network messages from anomalous automobile-network messages. In some embodiments, the computer-readable medium may include one or more computer-executable instructions that, when executed by at least one processor of a computing device, may cause the computing device to further (1) detect an automobile-network message that has been broadcast over the automobile network, (2) use the model to determine that the automobile-network message is anomalous, and (3) perform a security action in response to determining that the automobile-network message is anomalous.

In another example, a computer-implemented method for detecting anomalous messages in automobile networks may include (1) identifying a model that is capable of distinguishing expected automobile-network messages broadcast over an automobile network of an automobile from anomalous automobile-network messages broadcast over the automobile network, (2) detecting an automobile-network message that has been broadcast over the automobile network, (3) using the model to determine that the automobile-network message is anomalous, and (4) performing a security action in response to determining that the automobile-network message is anomalous.

In some embodiments, the model may have been created by a cloud-based computing system using a set of features extracted from a plurality of automobile-network messages that were previously broadcast over the automobile network. In at least one embodiment, the step of identifying the model may include (1) logging the plurality of automobile-network messages as they are broadcast over the automobile network, (2) transmitting information about the plurality of automobile-network messages to the cloud-based computing system, and (3) receiving the model from the cloud-based computing system.

In some embodiments, the steps of identifying, receiving, using, and performing may be performed by an electronic control unit that is connected to the automobile network and/or a logging device that is connected to the automobile network via a port of the automobile network.

In one embodiment, a system for implementing the above-described method may include (1) an identifying module, stored in memory, that identifies a model that is capable of distinguishing expected automobile-network messages broadcast over an automobile network of an automobile from anomalous automobile-network messages broadcast over the automobile network, (2) a detecting module, stored in memory, that detects an automobile-network message that has been broadcast over the automobile network, (3) a determining module, stored in memory, that uses the model to determine that the automobile-network message is anomalous, and (4) a security module, stored in memory, that performs a security action in response to determining that the automobile-network message is anomalous.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) identify a model that is capable of distinguishing expected automobile-network messages broadcast over an automobile network of an automobile from anomalous automobile-network messages broadcast over the automobile network, (2) detect an automobile-network message that has been broadcast over the automobile network, (3) use the model to determine that the automobile-network message is anomalous, and (4) perform a security action in response to determining that the automobile-network message is anomalous.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
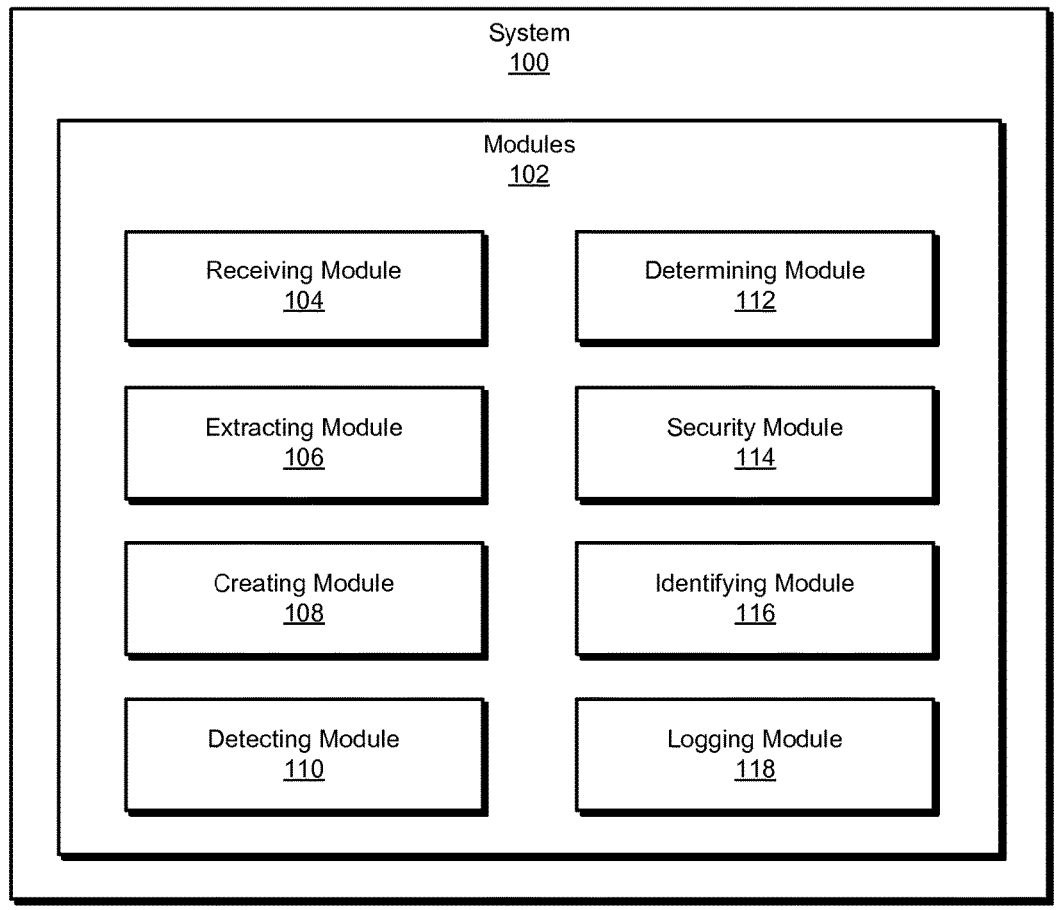
FIG. 1 is a block diagram of an exemplary system for detecting anomalous messages in automobile networks.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for detecting anomalous messages in automobile networks. As will be explained in greater detail below, by using features extracted from automobile-network messages that have been and/or are expected to be broadcast over normally functioning automobile networks to create models (e.g., baseline profiles, rule sets, and/or classifiers) that identify or define the features of expected automobile-network messages and/or anomalous automobile-network messages, the systems and methods described herein may enable the detection of malicious attacks on and/or malfunctioning components within the automobile networks. Furthermore, in some examples, by collecting and analyzing automobile-network messages that have been broadcast over a large number of similarly or identically configured automobile networks (e.g., the automobile networks of a certain make and model of automobile), the systems and methods described herein may improve the detection of malicious attacks on and/or malfunctioning components within these automobile networks. Embodiments of the instant disclosure may also provide various other advantages and features, as discussed in greater detail below.

Figure 2:
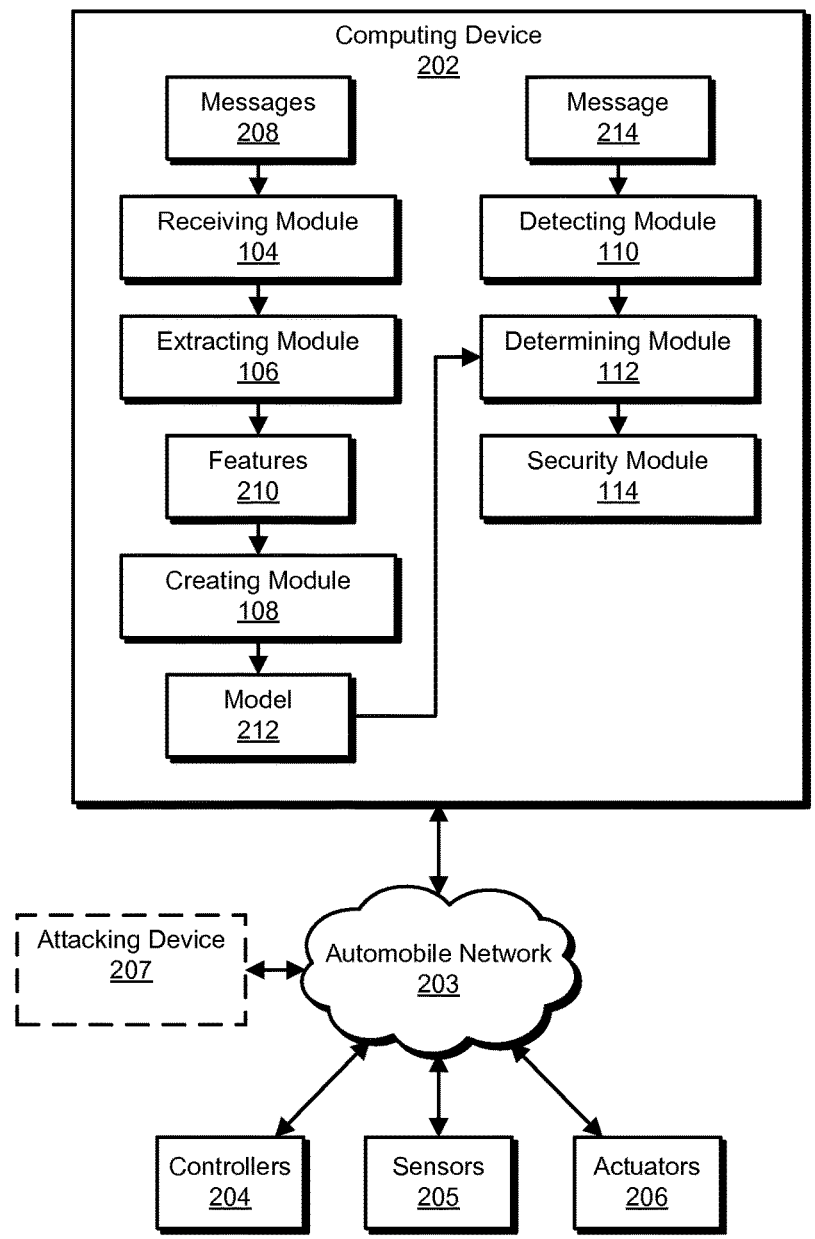
FIG. 2 is a block diagram of an additional exemplary system for detecting anomalous messages in automobile networks.
Figure 3:
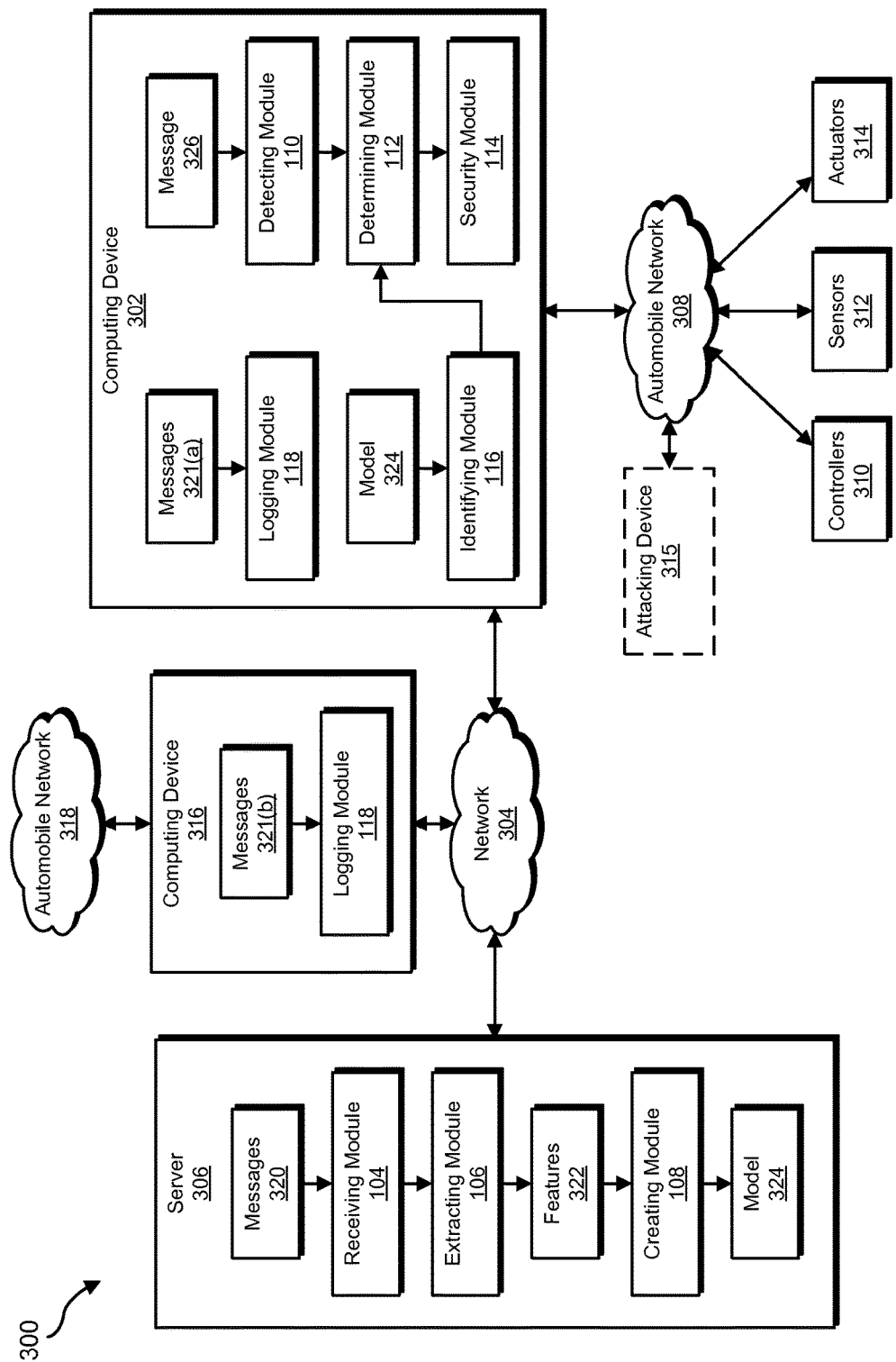
FIG. 3 is a block diagram of an additional exemplary system for detecting anomalous messages in automobile networks.

The following will provide, with reference to FIGS. 1-3, detailed descriptions of exemplary systems for detecting anomalous messages in automobile networks. Detailed descriptions of corresponding computer-implemented methods will also be provided in connection with FIGS. 5-8. In addition, detailed descriptions of an exemplary automobile network and an exemplary computing system capable of implementing one or more of the embodiments described herein will be provided in connection with FIGS. 4 and 9, respectively.

FIG. 1 is a block diagram of an exemplary system 100 for detecting anomalous messages in automobile networks. As illustrated in this figure, exemplary system 100 may include one or more modules 102 for performing one or more tasks. For example, and as will be explained in greater detail below, exemplary system 100 may include a receiving module 104 that receives automobile-network messages that are expected to be broadcast over an automobile network of an automobile. Exemplary system 100 may also include an extracting module 106 that extracts a set of features from the automobile-network messages. Exemplary system 100 may further include a creating module 108 that uses the set of features to create a model that is capable of distinguishing expected automobile-network messages from anomalous automobile-network messages.

In addition, and as will be described in greater detail below, exemplary system 100 may include a detecting module 110 that detects an automobile-network message that has been broadcast over the automobile network. Exemplary system 100 may also include a determining module 112 that uses the model to determine that the automobile-network message is anomalous. Exemplary system 100 may further include a security module 114 that performs a security action in response to determining that the automobile-network message is anomalous.

In certain embodiments, exemplary system 100 may include an identifying module 116 that identifies a model that is capable of distinguishing expected automobile-network messages from anomalous automobile-network messages. Exemplary system 100 may also include a logging module 118 that logs the automobile-network messages as they are broadcast over the automobile network. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as computing device 202 in FIG. 2, the devices illustrated in FIG. 3 (e.g., computing device 302, server 306, and/or computing device 316), the devices illustrated in FIG. 4 (e.g., electronic control unit 404 and/or logging device 416), and/or computing system 910 in FIG. 9. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202, controllers 204, sensors 205, and actuators 206 connected via an automobile network 203. In this example, computing device 202, controllers 204, sensors 205, and actuators 206 may be capable of broadcasting and/or receiving automobile-network messages (e.g., automobile-network message 600 in FIG. 6) via automobile network 203. In some examples, an attacker may use an attacking device 207 to connect to and perpetrate an attack on automobile network 203.

In one embodiment, one or more of modules 102 from FIG. 1 may, when executed by at least one processor of computing device 202, enable computing device 202 to detect anomalous messages in automobile network 203. For example, and as will be described in greater detail below, one or more of modules 102 may cause computing device 202 to (1) receive automobile-network messages 208 that have been and/or are expected to be broadcast over automobile network 203 (e.g., automobile-network messages that have been broadcast by controllers 204, sensors 205, and/or actuators 206) (2) extract a set of features 210 from automobile-network messages 208, and (3) use the set of features 210 to create a model 212 that is capable of distinguishing expected automobile-network messages from anomalous automobile-network messages. In some embodiments, one or more of modules 102 may further cause computing device 202 to (1) detect an automobile-network message 214 that has been broadcast over automobile network 203 (e.g., an automobile-network message that was broadcast by attacking device 207), (2) use model 212 to determine that automobile-network message 214 is anomalous, and (3) perform a security action in response to determining that automobile-network message 214 is anomalous.

FIG. 3. illustrates an additional or alternative exemplary implementation of exemplary system 100 in FIG. 1. As shown in FIG. 3, system 300 may include a computing device 302, a server 306, and a computing device 316 in communication via a network 304. System 300 may also include controllers 310, sensors 312, and actuators 314 that are connected to computing device 302 via an automobile network 308. In this example, computing device 302, controllers 310, sensors 312, and actuators 314 may be capable of broadcasting and/or receiving automobile-network messages (e.g., automobile-network message 600 in FIG. 6) via automobile network 308.

As shown in FIG. 3, computing device 316 may be connected to an additional automobile network 318 over which computing device 316 may be capable of broadcasting and/or receiving automobile-network messages. As illustrated, automobile network 308 and automobile network 318 may represent the automobile networks of two automobiles. In at least one example, the two automobiles may have the same make, model, and/or automobile-network configuration. In some examples, an attacker may use an attacking device 315 to connect to and perpetrate an attack on automobile network 308.

In one embodiment, one or more of modules 102 from FIG. 1 may, when executed by at least one processor of computing device 302, server 306, and/or computing device 316, enable computing device 302 and/or server 306 to detect anomalous messages in automobile network 308. For example, and as will be described in greater detail below, one or more of modules 102 may cause server 306 to (1) receive automobile-network messages 320 that have been and/or are expected to be broadcast over automobile network 308 (e.g., automobile-network messages that have been broadcast over automobile networks 308 and/or 318) (2) extract a set of features 322 from automobile-network messages 320, and (3) use the set of features 322 to create a model 324 that is capable of distinguishing expected automobile-network messages from anomalous automobile-network messages. In some embodiments, one or more of modules 102 may further cause computing device 302 to (1) identify model 324, (2) detect an automobile-network message 326 that has been broadcast over automobile network 308 (e.g., an automobile-network message that was broadcast by attacking device 315), (3) use model 324 to determine that automobile-network message 326 is anomalous, and (4) perform a security action in response to determining that automobile-network message 326 is anomalous.

In the preceding exemplary implementations of exemplary system 100 in FIG. 1, computing devices 202, 302, and 316 generally represent any type or form of computing device capable of reading computer-executable instructions and/or collecting automobile-network messages that are broadcast over an automobile network. Examples of computing devices 202, 302, and 316 include, without limitation, electronic control units (ECUs), automobile-network dongles, diagnostic devices, embedded systems, laptops, tablets, desktops, servers, cellular phones, Personal Digital Assistants (PDAs), wearable devices (e.g., smart watches, smart glasses, etc.), combinations of one or more of the same, exemplary computing system 910 in FIG. 9, or any other suitable computing device. In at least one example, computing devices 202, 302, or 316 may represent a logging device that is intended to (1) be plugged directly into an automobile's network and/or (2) collect and/or monitor automobile-network messages for the purpose of detecting attacks on the automobile's network and/or malfunctioning components within the automobile's network. Additionally or alternatively, computing devices 202, 302, or 316 may represent an ECU that is intended to (1) be connected directly to an automobile's network and/or (2) collect and/or monitor automobile-network messages for the purpose of detecting attacks on the automobile's network and/or malfunctioning components within the automobile's network.

Automobile networks 203, 308, and 318 generally represent any medium or architecture capable of facilitating communication or data transfer amongst the components (e.g., controllers, sensors, and/or actuators) of an automobile. Examples of automobile networks 203, 308, and 318 include, without limitation, Controller Area Networks (CANs), FlexRay Networks, Local Interconnect Networks (LINs), in-vehicle buses, and/or exemplary automobile network 400 in FIG. 4. Automobile networks 203, 308, and 318 may facilitate communication or data transfer using wireless or wired connections. In some examples, automobile networks 203, 308, and 318 may represent a broadcast and/or serial network.

Server 306 generally represents any type or form of computing device that is capable of reading computer-executable instructions. Examples of server 306 include, without limitation, application servers and database servers configured to provide various database services and/or run certain software applications.

Network 304 generally represents any medium or architecture capable of facilitating communication or data transfer. Examples of network 304 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), a Wi-Fi network or communication channel, a Bluetooth network or communication channel, a Near Field Communication (NFC) network or communication channel, or the like. Network 304 may facilitate communication or data transfer using wireless or wired connections. In one embodiment, network 304 may facilitate communication between computing device 302, server 306, and/or computing device 316.

Attacking devices 207 and 315 generally represent any type or form of computing device with which an attacker may connect to or perpetrate an attack on automobile network 203 or 308 by broadcasting malicious automobile-network messages to network 203 or 308. Examples of attacking devices 207 and 315 include, without limitation, compromised electronic control units (ECUs), automobile-network dongles, and/or any other computing device.

Figure 4:
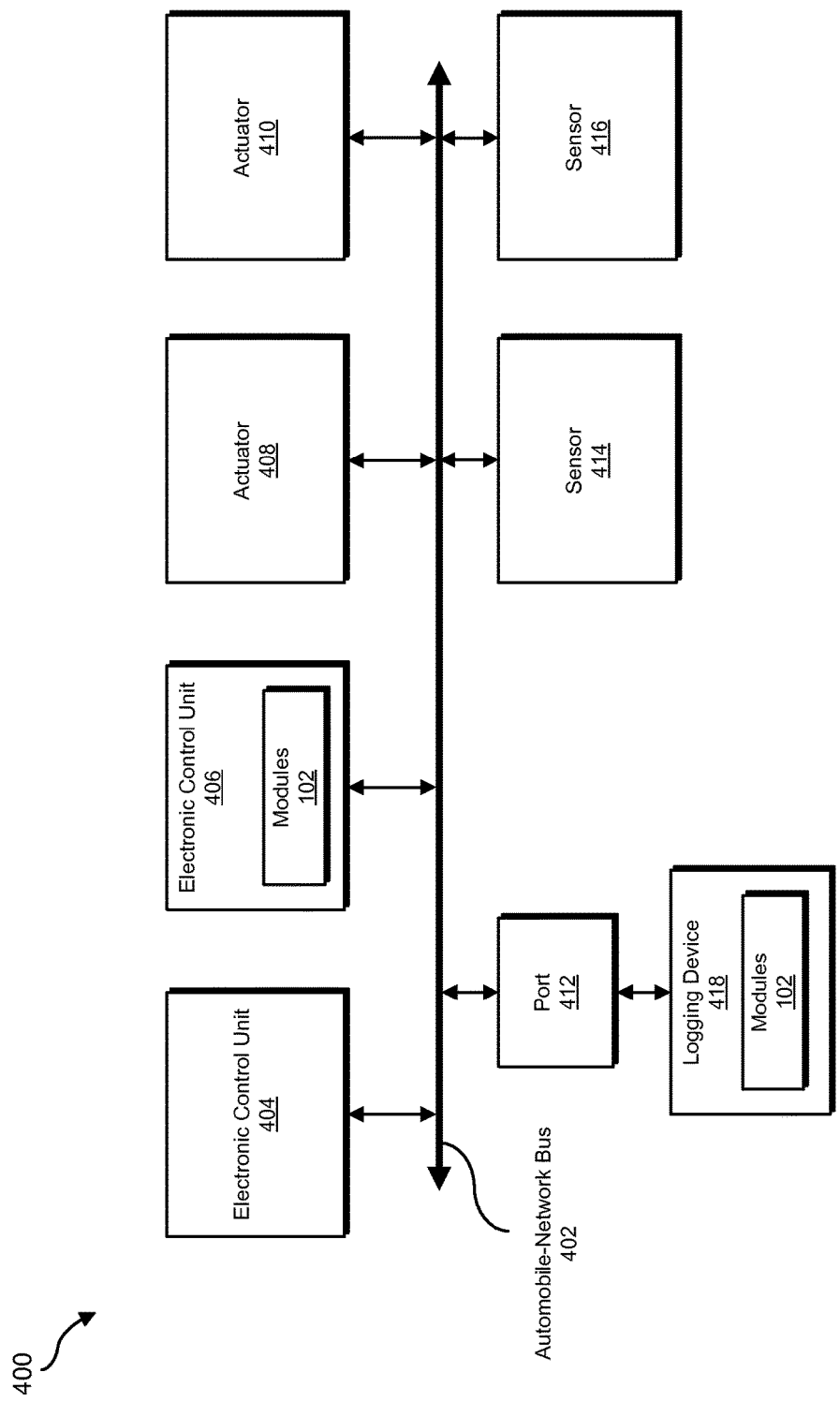
FIG. 4 is a block diagram of an exemplary automobile network.

FIG. 4 is a block diagram of an exemplary automobile network 400 of an automobile. As shown in FIG. 4, exemplary automobile network 400 may include ECUs 404 and 406, actuators 408 and 410, and sensors 414 and 416 connected via a common automobile-network bus 402. ECUs 404 and 406 generally represent any computing device or embedded system that controls or monitors a system or subsystem of an automobile. Examples of ECUs 404 and 406 include, without limitation, engine control units, brake control units, transmission control units, power-steering control units, and power-lock control units.

Actuators 408 and 410 generally represent any mechanical device that actuates a component of an automobile (e.g., throttle actuators, brake actuators, and power-steering actuators), and sensors 414 and 416 generally represent any sensor that measures attributes of an automobile (e.g., speed sensors, accelerometers, throttle position sensors, pedal position sensors, and steering-wheel position sensors, etc.). Automobile-network bus 402 generally represents any in-vehicle bus that interconnects the components of an automobile and that allows the components to exchange data. Examples of automobile-network bus 402 include, without limitation, CAN buses and LIN buses.

As shown in FIG. 4, exemplary automobile network 400 may also include a port 412 through which various devices (e.g., diagnostic, monitoring, or logging devices such as logging device 418) may connect to automobile-network bus 402. Port 412 generally represents an automobile's diagnostic port (such as, e.g., an On-Board Diagnostic (OBD) II port).

Figure 5:
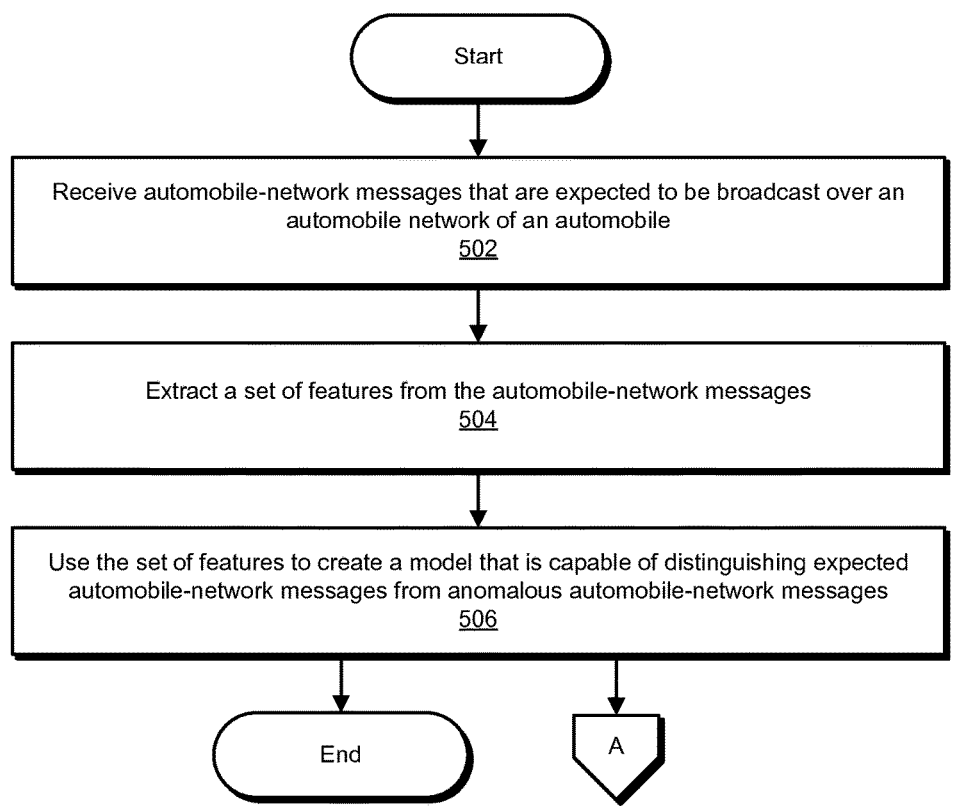
FIG. 5 is a flow diagram of an exemplary method for detecting anomalous messages in automobile networks.

FIG. 5 is a flow diagram of an exemplary computer-implemented method 500 for detecting anomalous messages in automobile networks. The steps shown in FIG. 5 may be performed by any suitable computer-executable code and/or computing system. In some embodiments, the steps shown in FIG. 5 may be performed by one or more of the components of system 100 in FIG. 1, system 200 in FIG. 2, system 300 in FIG. 3, automobile network 400 in FIG. 4, and/or computing system 910 in FIG. 9.

As illustrated in FIG. 5, at step 502 one or more of the systems described herein may receive automobile-network messages that are expected to be broadcast over an automobile network of an automobile. For example, receiving module 104 may, as part of computing device 202 in FIG. 2, receive automobile-network messages 208 that were broadcast over automobile network 203. In another example, receiving module 104 may, as part of server 306 in FIG. 3, receive automobile-network messages 320 (e.g., automobile-network messages 321(a) that were broadcast over automobile network 308 and/or automobile-network messages 321(b) that were broadcast over automobile network 318).

As used herein, the term "automobile-network message" may refer to any discrete communication (e.g., a packet or frame) that is transmitted over an automobile network by a component (e.g., an ECU, a sensor, and/or an actuator) that is connected to the automobile network. Automobile-network messages that are expected to be broadcast over an automobile network of an automobile may include (1) automobile-network messages that have been previously broadcast over the automobile network and/or (2) automobile-network messages that have been previously broadcast over a similarly or identically configured automobile network (e.g., the automobile network of a similarly or identically configured automobile).

Receiving module 104 may receive automobile-network messages that are expected to be broadcast over an automobile network of an automobile in a variety of ways. In one example, receiving module 104 may receive the automobile-network messages by logging, as part of an ECU that is connected to the automobile network and/or a logging device that is connected to the automobile network via a port of the automobile network, the automobile-network messages as they are broadcast over the automobile network. Using FIG. 2 as an example, receiving module 104 may log automobile-network messages 208 as they are broadcast over automobile network 203 and received at computing device 202.

Additionally or alternatively, receiving module 104 may receive automobile-network messages that are expected to be broadcast over an automobile network of an automobile from a device that is connected to the automobile network and that logged the automobile-network messages when they were broadcast. Using FIG. 3 as an example, receiving module 104 may receive, as part of server 306, automobile-network messages 321(a) from computing device 302 and automobile-network messages 321(b) from computing device 316. In this example, computing device 302 may have logged automobile-network messages 321(a) when they were broadcast over automobile network 308, and computing device 316 may have logged automobile-network messages 321(b) when they were broadcast over automobile network 318.

In at least one example, receiving module 104 may receive automobile-network messages that have been broadcast over a large number of similarly or identically configured automobile networks. In some examples, receiving module 104 may receive automobile-network messages that are expected to be broadcast over an automobile network of an automobile from an entity associated with the automobile, the automobile network, and/or any of the automobile-network components connected to the automobile network (e.g., a manufacturer).

At step 504, one or more of the systems described herein may extract a set of features from the automobile-network messages received at step 502. For example, extracting module 106 may, as part of computing device 202 in FIG. 2, extract a set of features 210 from automobile-network messages 208. In another example, extracting module 106 may, as part of server 306 in FIG. 3, extract a set of features 322 from automobile-network messages 320.

As used herein, the term "feature" may refer to the value of any characteristic, attribute, or property of one or more automobile-network messages that may be used to determine whether all or a portion of the automobile-network messages are expected or anomalous. Examples of such features may include message types, message lengths, message counts, message timings, and/or message frequencies. Additionally or alternatively, the term "feature" may refer to the value of any characteristic, attribute, or property of the data conveyed by one or more automobile-network messages that may be used to determine whether all or a portion of the automobile-network messages are expected or anomalous. For example, the term "feature" may refer to any attribute of an automobile or its component parts that is conveyed by an automobile-network message and/or any combination of concurrent attributes of the automobile and/or its component parts that are conveyed by one or more automobile-network messages. Examples of such features may include, without limitation, speeds, accelerations, decelerations, turning angles, pedal positions, steering wheel positions, g-forces, and/or combinations of one or more of the same. In at least one example, the term "feature" may refer to an indicator of how the attributes of an automobile or its component parts change over time and/or how the attributes are related or correlated.

In some examples, the term "feature" may refer to the encoded or decoded values of certain bit fields defined by high or low level automobile-network protocols (e.g., the CAN protocol, the FlexRay protocol, the J1939 protocol, etc.) or device protocols (e.g., a protocol used by a device to encode and/or decode data conveyed via an automobile-network message). In at least one example, the term feature may refer to the value of any portion of an automobile-network message (e.g., the value of one or more of an automobile-network message's bytes).

Figure 6:
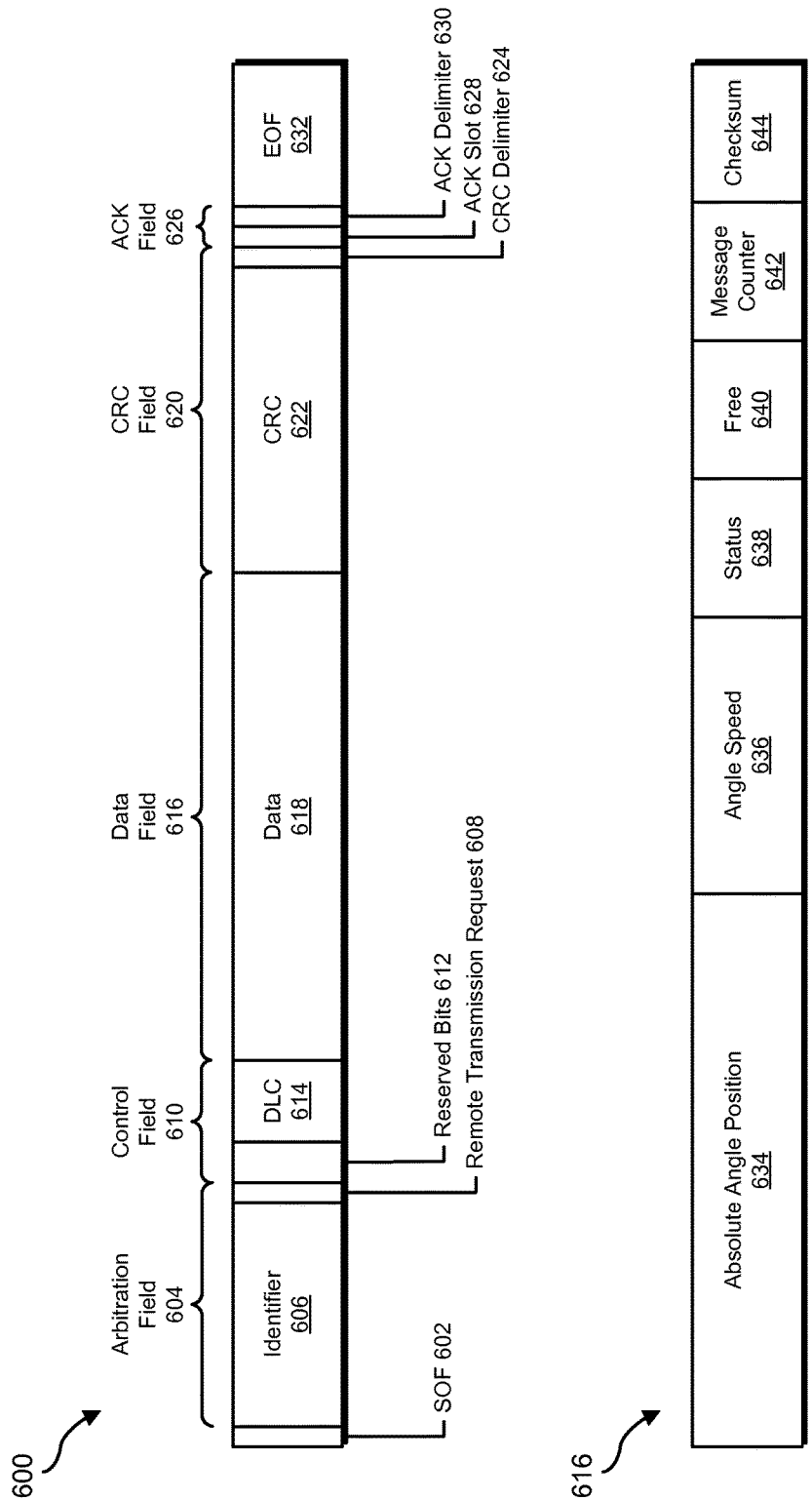
FIG. 6 is a block diagram on an exemplary automobile-network message.
Figure 7:
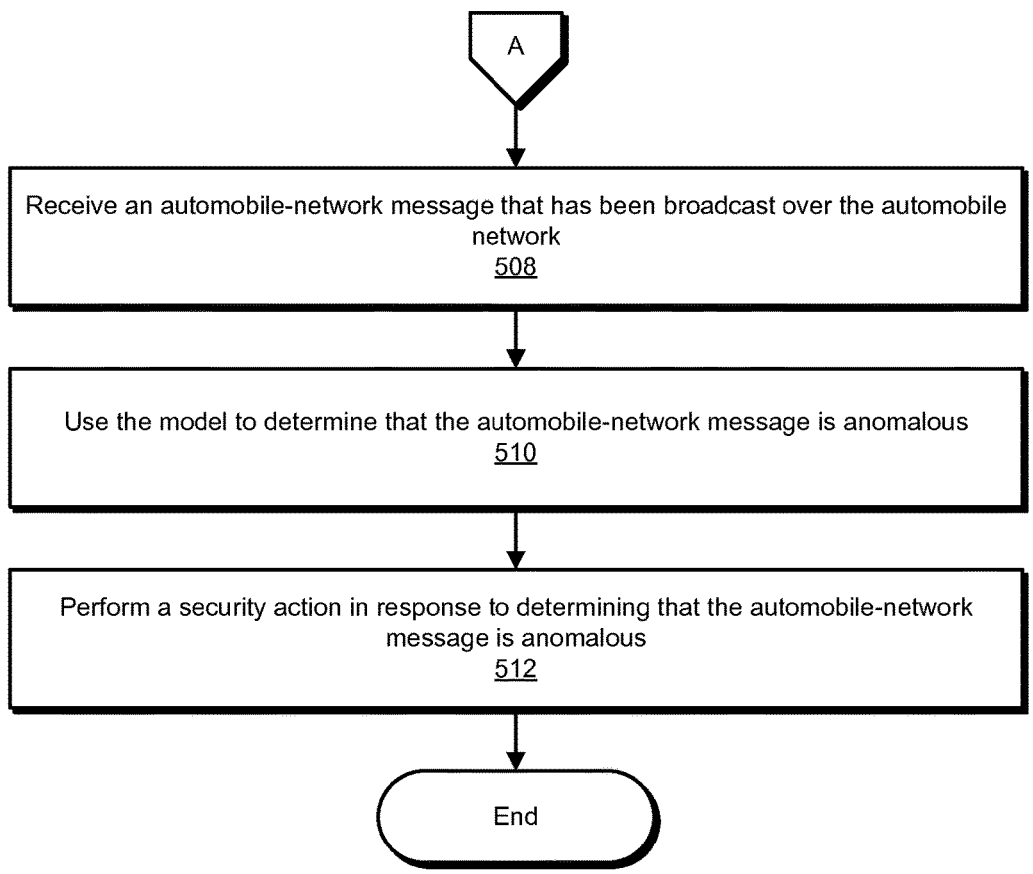
FIG. 7 is a flow diagram of a portion of an exemplary method for detecting anomalous messages in automobile networks.

FIG. 6 illustrates various features of an exemplary automobile-network message 600. As shown, exemplary automobile-network message 600 may represent a standard CAN frame. In this example, features of automobile-network message 600 may include, without limitation, the value of arbitration field 604, the value of identifier 606, the value of remote transmission request 608, the value of control field 610, the value of Data Length Code (DLC) 614, the value of data field 616, the value of data 618, the encoded or decoded value of absolute angle position 634, the encoded or decoded value of angle speed 636, the encoded or decoded value of status 638, the value of message counter 642, the value of each byte of automobile-network message 600, and/or any value contained in any other portion of automobile-network message 600.

Returning to FIG. 5, extracting module 106 may extract a set of features from a collection of automobile-network messages in any suitable manner. In general, extracting module 106 may extract some or all of the features described above from a collection of automobile-network messages. In some examples, extracting module 106 may extract a feature by calculating the feature based on an analysis of a collection of automobile-network messages. For example, extracting module 106 may calculate the number of each type of automobile-network message that is represented within a collection of automobile-network messages and/or the frequency at which each type of automobile-network message that is represented within the collection of automobile-network messages was broadcast.

In one example, extracting module 106 may extract a feature by decoding the feature. For example, extracting module 106 may decode the value of any attribute of an automobile or one of its component parts that is conveyed by an automobile-network message. In at least one example, extracting module 106 may decode a feature from an automobile-network message based on an understanding of the protocol used to encode the feature.

At step 506, one or more of the systems described herein may use the set of features extracted at step 504 to create a model that is capable of distinguishing expected automobile-network messages from anomalous automobile-network messages. For example, creating module 108 may, as part of computing device 202 in FIG. 2, use set of features 210 to create model 212. In another example, creating module 108 may, as part of server 306 in FIG. 3, use set of features 322 to create model 324.

As used herein, the term "expected automobile-network message" may refer to any automobile-network message whose features conform to the features of automobile-network messages that have been or are predicted to be seen being broadcast over an automobile network of a normally functioning automobile. Examples of expected automobile-network messages may include, without limitation, messages whose features conform to the features of messages that have been or are predicted to be seen being broadcast over an automobile's network during normal operation of the automobile, messages whose features conform to the features of messages that have been or are predicted to be seen being broadcast by normally functioning ECUs, sensors, and/or actuators, and/or messages that convey a state of an attribute of an automobile that is within a range of predicted, possible, or plausible states of the attribute. On the other hand, the term "anomalous automobile-network message," as used herein, may refer to any automobile-network message that is not an expected automobile-network message. In some examples, detection of an anomalous automobile-network message may be indicative of a malicious attack or a malfunctioning automobile-network component.

Returning to FIG. 5, creating module 108 may use the set of features extracted at step 504 to create a model that is capable of distinguishing expected automobile-network messages from anomalous automobile-network messages in a variety of ways. In one example, creating module 108 may use the set of features to generate a baseline profile or rule set that defines one or more features of expected automobile-network messages and/or a baseline profile or rule set that defines one or more features of anomalous automobile-network messages. For example, creating module 108 may create a baseline profile or rule set for an automobile network that (1) includes a list of message types of the automobile-network messages that have been or are expected to be broadcast over the automobile network and (2) indicates that any automobile-network message whose message type is not in the list should be considered anomalous.

Additionally or alternatively, creating module 108 may create a baseline profile or rule set for a type of expected automobile-network message that defines common, possible, and/or plausible values for features of that type of automobile-network message. For example, creating module 108 may create a baseline profile or rule set that defines a range of common, possible, or plausible states of automobile attributes that are conveyed by a particular type of automobile-network message. For example, creating module 108 may create a baseline profile or rule set that defines a range of common, possible, or plausible speeds, accelerations, decelerations, turning angles, pedal positions, steering wheel positions, and/or g-forces that are conveyed by a particular type of automobile-network message.

In some examples, creating module 108 may create a baseline profile or rule set that defines common, possible, and/or plausible values for correlated features. For example, creating module 108 may create a baseline profile or rule set that defines a range of states of one attribute of an automobile that are common, possible, and/or plausible when one or more other attributes of the automobile are in a particular state. For example, creating module 108 may create a baseline profile or rule set that defines a range of speeds that are common, possible, or plausible when an automobile is turning at a particular angle and/or when the steering wheel of the automobile is in a particular position. In some examples, the states of the attributes and the one or more other attributes may be conveyed by several automobile-network messages and/or several different types of automobile-network messages.

In some examples, creating module 108 may create machine-learning based models (e.g., ensemble models) that are trained using various subsets of the set of features extracted at step 504. In at least one example, creating module 108 may create a model that includes two or more classifiers by training each of the classifiers using a different subset of the set of features. For example, creating module 108 may create an ensemble model (e.g., a model that includes two or more classifiers) by applying a suitable ensemble machine-learning algorithm (e.g., a random forests ensemble learning algorithm) to the set of features.

In some examples, upon completion of step 506, exemplary method 500 in FIG. 5 may terminate. In other examples, upon completion of step 506, exemplary method 500 in FIG. 5 may continue at step 508 in FIG. 7. At step 508, one or more of the systems described herein may detect an automobile-network message that has been broadcast over the automobile network. For example, detecting module 110 may, as part of computing device 202 in FIG. 2, detect automobile-network message 214 that was broadcast over automobile network 203.

Detecting module 110 may detect automobile-network messages that have been broadcast over an automobile network in a variety of contexts. In one example, detecting module 110 may detect an automobile-network message as part of an ECU that is connected to an automobile network. Additionally or alternatively, detecting module 110 may detect an automobile-network message as part of a logging device that is connected to an automobile network via a port of the automobile network. In at least one example, detecting module 110 may detect an automobile-network message that was broadcast over an automobile network as part of a cloud-based computing system that receives the automobile-network message from an ECU that is connected to the automobile network and/or a logging device that is connected to the automobile network via a port of the automobile network.

At step 510, one or more of the systems described herein may use the model created at step 506 to determine that the automobile-network message is anomalous. For example, determining module 112 may, as part of computing device 202 in FIG. 2, use model 212 to determine that automobile-network message 214 is anomalous.

The systems described herein may use a model to determine that an automobile-network message is anomalous in any suitable manner. For example, determining module 112 may determine that an automobile-network message is anomalous if some or all of its features (1) do not conform to a baseline profile or rule set that defines the features of expected automobile-network messages and/or (2) do conform to a baseline profile or rule set that defines the features of anomalous automobile-network messages. For example, determining module 112 may determine that an automobile-network message is anomalous by determining that the message type of the automobile-network message does not match a message type of any expected or previously seen automobile-network message. In at least one example, determining module 112 may determine that an automobile-network message is anomalous only if a model indicates that the probability that the automobile network is anomalous is greater than a predetermined value.

In some instances, an automobile-network message may convey a state of an attribute of an automobile or one of its components, and a model may define a range of common, possible, or plausible states of the attribute. In these instances, determining module 112 may determine that the automobile-network message is anomalous if it conveys a state of the attribute that is outside of the range of common, possible, or plausible states of the attribute. For example, determining module 112 may determine that an automobile-network message that conveys a speed of an automobile is anomalous if the speed is higher than an actual or previously seen top speed of the automobile.

Additionally or alternatively, an automobile-network message that conveys a state of an attribute of an automobile may be detected when one or more other attributes of the automobile are in a particular state, and a model may define a range of states of the attribute of the automobile that are common, possible, or plausible when the one or more other attributes are in the particular state. In these instances, determining module 112 may determine that the automobile-network message is anomalous if it conveys a state of the attribute that is outside of the range of states of the attribute that are common, possible, or plausible when the one or more other attributes are in the particular state. For example, determining module 112 may determine that an automobile-network message is anomalous if the automobile-network message conveys a speed of an automobile that is not common, possible, or plausible for the current turning angle and/or steering wheel position of the automobile.

In some examples, if a model includes a classifier, determining module 112 may determine that an automobile-network message is anomalous by applying the classifier to the automobile-network message. If the model is an ensemble model that includes several classifiers, determining module 112 may use the classifiers to determine whether an automobile-network message is expected or anomalous by (1) calculating an aggregate classification for the automobile-network message based on a classification of the automobile-network message by each of the classifiers and (2) determining that the aggregate classification of the automobile-network message indicates that the automobile-network message is anomalous.

At step 512, one or more of the systems described herein may perform a security action in response to determining that the automobile-network message is anomalous. For example, security module 114 may, as part of computing device 202 in FIG. 2, perform a security action in response to determining that automobile-network message 214 is anomalous.

The systems described herein may perform a variety of security actions in response to determining that an automobile-network message is anomalous. In one example, security module 114 may record, flag and/or report an anomalous automobile-network message to an interested party (e.g., a driver, an automobile manufacture, a security-service provider, etc.). Additionally or alternatively, security module 114 may inform an interested party that a detected anomalous automobile-network message is or may be indicative of a malicious attack on or a malfunctioning component within an automobile network. Upon completion of step 512, exemplary method 500 in FIG. 5 may terminate.

Figure 8:
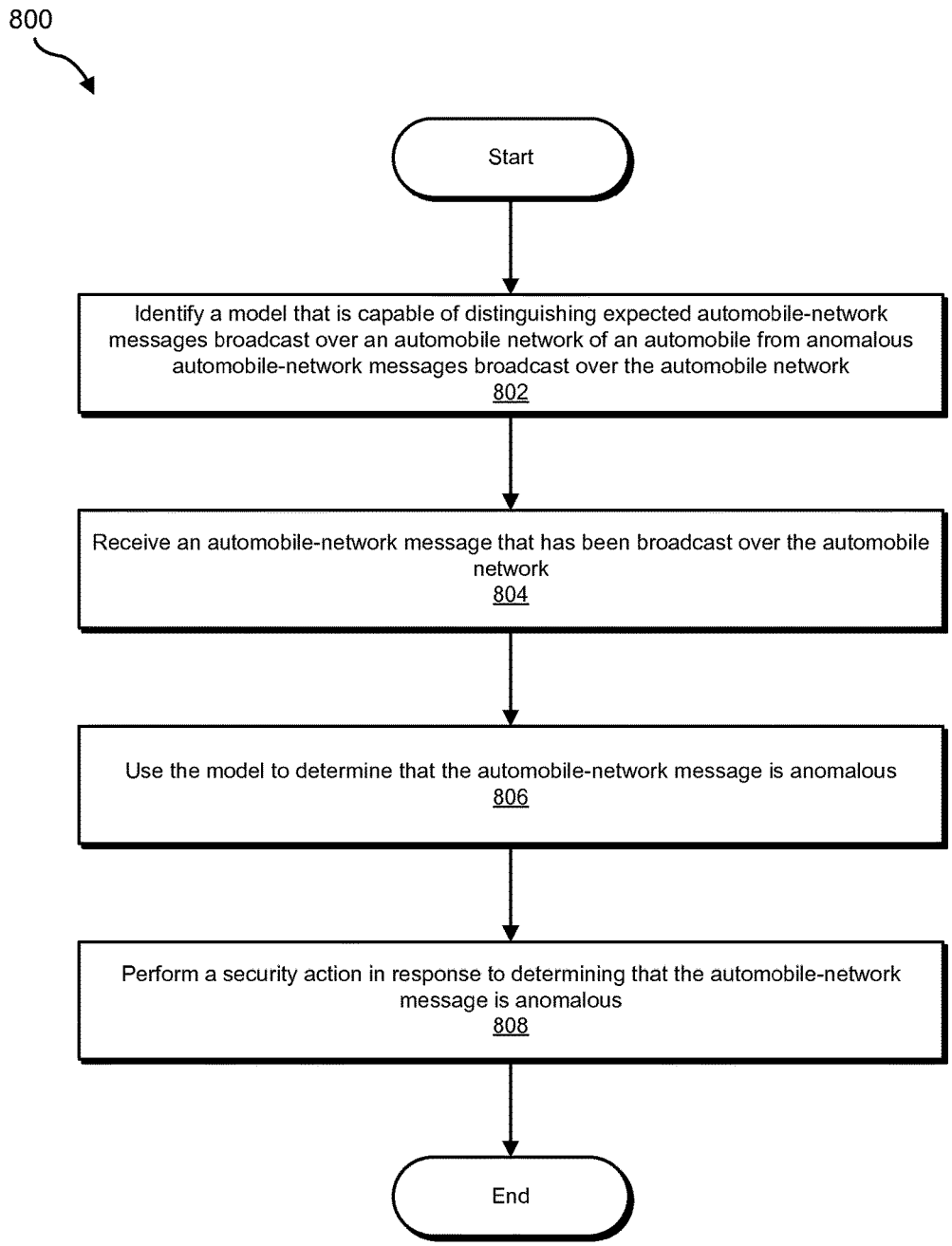
FIG. 8 is a flow diagram of an exemplary method for detecting anomalous messages in automobile networks.

In some examples, one of the systems described herein may use a model created by another system to detect anomalous messages. FIG. 8 is a flow diagram of an exemplary computer-implemented method 800 for detecting anomalous messages in automobile networks. The steps shown in FIG. 8 may be performed by any suitable computer-executable code and/or computing system. In some embodiments, the steps shown in FIG. 8 may be performed by one or more of the components of system 100 in FIG. 1, system 200 in FIG. 2, system 300 in FIG. 3, automobile network 400 in FIG. 4, and/or computing system 910 in FIG. 9.

At step 802, one or more of the systems described herein may identify a model that is capable of distinguishing expected automobile-network messages broadcast over an automobile network of an automobile from anomalous automobile-network messages broadcast over the automobile network. For example, identifying module 116 may, as part of computing device 302 in FIG. 3, identify model 324.

Identifying module 116 may identify a model that is capable of distinguishing expected automobile-network messages broadcast over an automobile network of an automobile from anomalous automobile-network messages broadcast over the automobile network in a variety of ways. In one example, identifying module 116 may query a cloud-based computing system for a model that was created to distinguish expected and anomalous automobile-network messages broadcast over a similarly or identically configured automobile network. For example, identifying module 116 may, as part of computing device 302, query server 306 for a model that was created for distinguishing expected and anomalous automobile-network messages broadcast over an automobile network with a configuration that is similar to that of automobile network 308.

Additionally or alternatively, identifying module 116 may identify a model that is capable of distinguishing expected automobile-network messages broadcast over an automobile network of an automobile from anomalous automobile-network messages broadcast over the automobile network by (1) logging automobile-network messages as they are broadcast over the automobile network, (2) transmitting information about the automobile-network messages to a cloud-based computing system that is capable of creating the model from a set of features extracted from the automobile-network messages, and (3) receiving the model from the cloud-based computing system. For example, identifying module 116 may, as part of computing device 302 in FIG. 3, identify model 324 by (1) logging automobile-network messages 321(a) as they are broadcast over automobile network 308, (2) transmitting information about automobile-network messages 321(a) to server 306, and (3) receiving model 324 from server 306.

At step 804, one or more of the systems described herein may detect an automobile-network message that has been broadcast over the automobile network. For example, detecting module 110 may, as part of computing device 302 in FIG. 3, detect automobile-network message 326 that has been broadcast over automobile network 308. Step 804 is similar to step 508 in FIG. 7. Therefore, the previous discussions of step 508 may also apply to step 804.

At step 806, one or more of the systems described herein may use the model to determine that the automobile-network message is anomalous. For example, at step 806 may, as part of computing device 302 in FIG. 3, use the model identified at step 802 to determine that automobile-network message 326 is anomalous. Step 806 is similar to step 510 in FIG. 7. Therefore, the previous discussions of step 510 may also apply to step 806.

At step 808, one or more of the systems described herein may perform a security action in response to determining that the automobile-network message is anomalous. For example, security module 114 may, as part of computing device 302 in FIG. 3, perform a security action in response to determining that automobile-network message 326 is anomalous. Step 808 is similar to step 512 in FIG. 7. Therefore, the previous discussions of step 512 may also apply to step 808. Upon completion of step 808, exemplary method 800 in FIG. 8 may terminate.

As explained above, by using features extracted from automobile-network messages that have been and/or are expected to be broadcast over normally functioning automobile networks to create models (e.g., baseline profiles, rule sets, and/or classifiers) that identify or define the features of expected automobile-network messages and/or anomalous automobile-network messages, the systems and methods described herein may enable the detection of malicious attacks on and/or malfunctioning components within the automobile networks. Furthermore, in some examples, by collecting and analyzing automobile-network messages that have been broadcast over a large number of similarly or identically configured automobile networks (e.g., the automobile networks of a certain make and model of automobile), the systems and methods described herein may improve the detection of malicious attacks on and/or malfunctioning components within these automobile networks.

For example, the systems and methods described herein may (1) log automobile-network messages that are broadcast over an automobile network of a normally functioning automobile, (2) extract a set of features from the automobile-network messages, (3) use the set of features to create a profile of the automobile-network messages, (4) detect, after the profile has been created, an additional automobile-network message that has been broadcast over the automobile network as part of an attack on the automobile network, (5) detect the attack by determining that the automobile-network message does not conform to the profile, and (6) report the attack on the automobile network. In another example, the systems and methods described herein may (1) log automobile-network messages that are broadcast over the automobile networks of a large number of automobiles of a particular make, model, and configuration, (2) extract a set of features from the automobile-network messages, (3) use the set of features to create a profile of the automobile-network messages, (4) detect an automobile-network message that has been broadcast over an automobile network of an automobile with the same make, model, and configuration by a malfunctioning sensor, (5) detect the malfunctioning sensor by determining that the automobile-network message does not conform to the profile, and (6) report the malfunctioning sensor.

Figure 9:
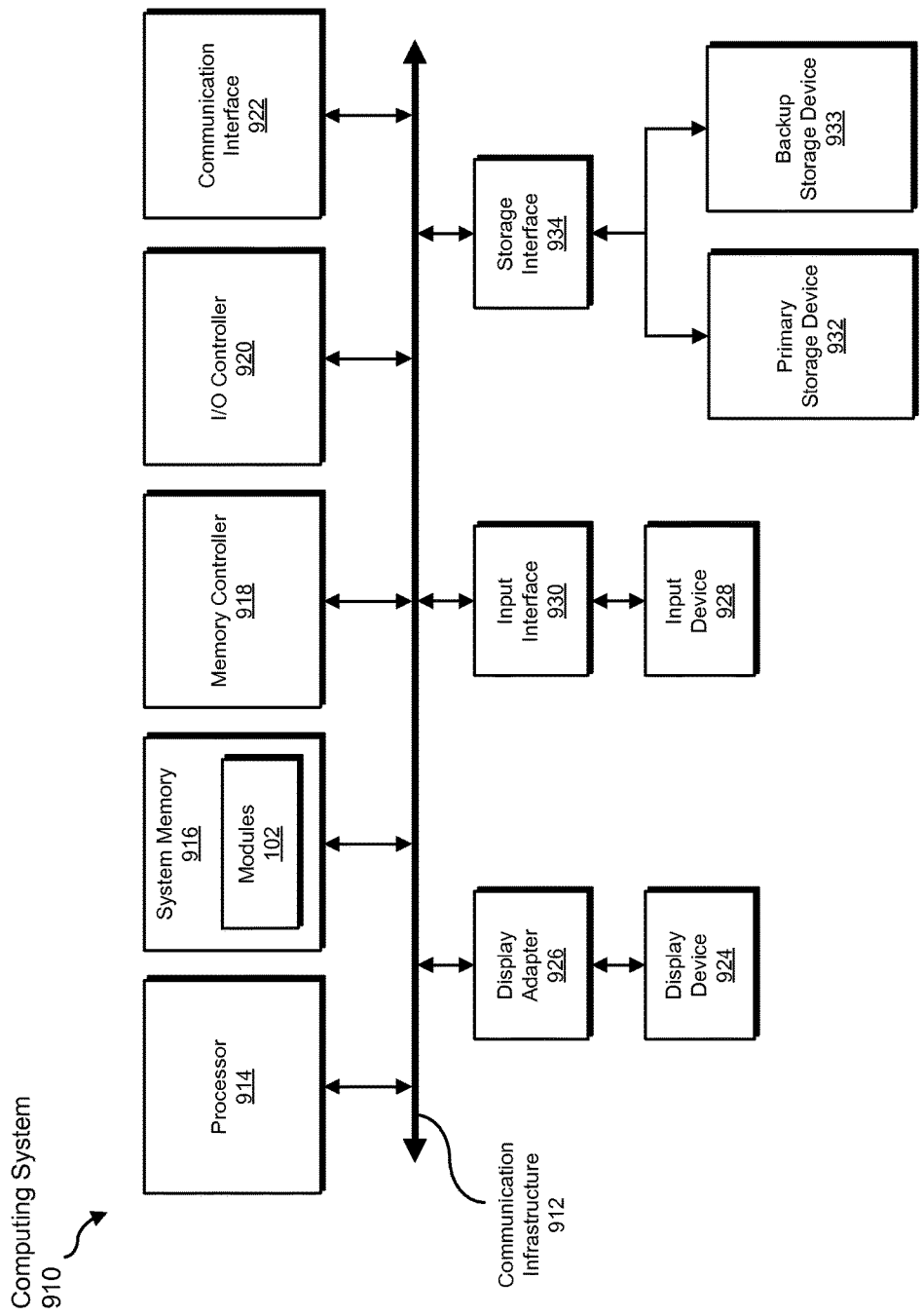
FIG. 9 is a block diagram of an exemplary computing system capable of implementing one or more of the embodiments described and/or illustrated herein.

FIG. 9 is a block diagram of an exemplary computing system 910 capable of implementing one or more of the embodiments described and/or illustrated herein. For example, all or a portion of computing system 910 may perform and/or be a means for performing, either alone or in combination with other elements, one or more of the steps described herein (such as one or more of the steps illustrated in FIG. 5). All or a portion of computing system 910 may also perform and/or be a means for performing any other steps, methods, or processes described and/or illustrated herein.

Computing system 910 broadly represents any single or multi-processor computing device or system capable of executing computer-readable instructions. Examples of computing system 910 include, without limitation, workstations, laptops, client-side terminals, servers, distributed computing systems, handheld devices, or any other computing system or device. In its most basic configuration, computing system 910 may include at least one processor 914 and a system memory 916.

Processor 914 generally represents any type or form of physical processing unit (e.g., a hardware-implemented central processing unit) capable of processing data or interpreting and executing instructions. In certain embodiments, processor 914 may receive instructions from a software application or module. These instructions may cause processor 914 to perform the functions of one or more of the exemplary embodiments described and/or illustrated herein.

System memory 916 generally represents any type or form of volatile or non-volatile storage device or medium capable of storing data and/or other computer-readable instructions. Examples of system memory 916 include, without limitation, Random Access Memory (RAM), Read Only Memory (ROM), flash memory, or any other suitable memory device. Although not required, in certain embodiments computing system 910 may include both a volatile memory unit (such as, for example, system memory 916) and a non-volatile storage device (such as, for example, primary storage device 932, as described in detail below). In one example, one or more of modules 102 from FIG. 1 may be loaded into system memory 916.

In certain embodiments, exemplary computing system 910 may also include one or more components or elements in addition to processor 914 and system memory 916. For example, as illustrated in FIG. 9, computing system 910 may include a memory controller 918, an Input/Output (I/O) controller 920, and a communication interface 922, each of which may be interconnected via a communication infrastructure 912. Communication infrastructure 912 generally represents any type or form of infrastructure capable of facilitating communication between one or more components of a computing device. Examples of communication infrastructure 912 include, without limitation, a communication bus (such as an Industry Standard Architecture (ISA), Peripheral Component Interconnect (PCI), PCI Express (PCIe), or similar bus) and a network.

Memory controller 918 generally represents any type or form of device capable of handling memory or data or controlling communication between one or more components of computing system 910. For example, in certain embodiments memory controller 918 may control communication between processor 914, system memory 916, and I/O controller 920 via communication infrastructure 912.

I/O controller 920 generally represents any type or form of module capable of coordinating and/or controlling the input and output functions of a computing device. For example, in certain embodiments I/O controller 920 may control or facilitate transfer of data between one or more elements of computing system 910, such as processor 914, system memory 916, communication interface 922, display adapter 926, input interface 930, and storage interface 934.

Communication interface 922 broadly represents any type or form of communication device or adapter capable of facilitating communication between exemplary computing system 910 and one or more additional devices. For example, in certain embodiments communication interface 922 may facilitate communication between computing system 910 and a private or public network including additional computing systems. Examples of communication interface 922 include, without limitation, a wired network interface (such as a network interface card), a wireless network interface (such as a wireless network interface card), a modem, and any other suitable interface. In at least one embodiment, communication interface 922 may provide a direct connection to a remote server via a direct link to a network, such as the Internet. Communication interface 922 may also indirectly provide such a connection through, for example, a local area network (such as an Ethernet network), a personal area network, a telephone or cable network, a cellular telephone connection, a satellite data connection, or any other suitable connection.

In certain embodiments, communication interface 922 may also represent a host adapter configured to facilitate communication between computing system 910 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 922 may also allow computing system 910 to engage in distributed or remote computing. For example, communication interface 922 may receive instructions from a remote device or send instructions to a remote device for execution.

As illustrated in FIG. 9, computing system 910 may also include at least one display device 924 coupled to communication infrastructure 912 via a display adapter 926. Display device 924 generally represents any type or form of device capable of visually displaying information forwarded by display adapter 926. Similarly, display adapter 926 generally represents any type or form of device configured to forward graphics, text, and other data from communication infrastructure 912 (or from a frame buffer, as known in the art) for display on display device 924.

As illustrated in FIG. 9, exemplary computing system 910 may also include at least one input device 928 coupled to communication infrastructure 912 via an input interface 930. Input device 928 generally represents any type or form of input device capable of providing input, either computer or human generated, to exemplary computing system 910. Examples of input device 928 include, without limitation, a keyboard, a pointing device, a speech recognition device, or any other input device.

As illustrated in FIG. 9, exemplary computing system 910 may also include a primary storage device 932 and a backup storage device 933 coupled to communication infrastructure 912 via a storage interface 934. Storage devices 932 and 933 generally represent any type or form of storage device or medium capable of storing data and/or other computer-readable instructions. For example, storage devices 932 and 933 may be a magnetic disk drive (e.g., a so-called hard drive), a solid state drive, a floppy disk drive, a magnetic tape drive, an optical disk drive, a flash drive, or the like. Storage interface 934 generally represents any type or form of interface or device for transferring data between storage devices 932 and 933 and other components of computing system 910.

In certain embodiments, storage devices 932 and 933 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 932 and 933 may also include other similar structures or devices for allowing computer software, data, or other computer-readable instructions to be loaded into computing system 910. For example, storage devices 932 and 933 may be configured to read and write software, data, or other computer-readable information. Storage devices 932 and 933 may also be a part of computing system 910 or may be a separate device accessed through other interface systems.

Many other devices or subsystems may be connected to computing system 910. Conversely, all of the components and devices illustrated in FIG. 9 need not be present to practice the embodiments described and/or illustrated herein. The devices and subsystems referenced above may also be interconnected in different ways from that shown in FIG. 9. Computing system 910 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 910. All or a portion of the computer program stored on the computer-readable medium may then be stored in system memory 916 and/or various portions of storage devices 932 and 933. When executed by processor 914, a computer program loaded into computing system 910 may cause processor 914 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 910 may be configured as an Application Specific Integrated Circuit (ASIC) adapted to implement one or more of the exemplary embodiments disclosed herein.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed.

The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive automobile-network messages to be transformed, transform the automobile-network messages into a model that is capable of distinguishing expected automobile-network messages from anomalous automobile-network messages, output a result of the transformation to a security system that detects anomalous automobile-network messages broadcast over an automobile network, use the result of the transformation to detect an anomalous automobile-network message broadcast over an automobile network, and store the result of the transformation to a storage system.

In another example, one or more of the modules recited herein may detect an automobile-network message and a model that is capable of distinguishing expected automobile-network messages from anomalous automobile-network messages, transform the automobile-network message and the model into determination that the automobile-network message is anomalous, output a result of the transformation to a security system that handles anomalous automobile-network messages, use the result of the transformation to handle the anomalous automobile-network message, and store the result of the transformation to a storage system. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for detecting anomalous messages in automobile networks, at least a portion of the method being performed by a computing device comprising at least one processor, the method comprising:
    receiving, at a cloud-based computing system from a first logging device of a first automobile, a first plurality of automobile-network messages that were broadcast over a first automobile network of the first automobile by at least one of a first electronic control unit, a first sensor, and a first actuator;
    receiving, at the cloud-based computing system from a second logging device of a second automobile, a second plurality of automobile-network messages that were broadcast over a second automobile network of the second automobile by at least one of a second electronic control unit, a second sensor, and a second actuator, wherein the second electronic control unit, the second sensor, and the second actuator are respectively substantially similar to the first electronic control unit, the first sensor, and the first actuator, and wherein the second automobile network is substantially similar to the first automobile network;
    extracting, at the cloud-based computing system, a set of features from the first plurality of automobile-network messages and the second plurality of automobile-network messages;
    creating, at the cloud-based computing system using the set of features, a model capable of distinguishing expected automobile-network messages broadcast over a third automobile network of a third automobile from anomalous automobile-network messages broadcast over the third automobile network, wherein the third automobile network is substantially similar to the first and second automobile networks; and
    enabling a security device at the third automobile to detect anomalous automobile-network messages broadcast over the third automobile network by transmitting the model from the cloud-based computing system to the third automobile.

2. The computer-implemented method of claim 1, further comprising:
    detecting an automobile-network message that has been broadcast over the third automobile network;
    using the model to determine that the automobile-network message is anomalous; and
    performing a security action in response to determining that the automobile-network message is anomalous.

3. The computer-implemented method of claim 2, wherein:
    creating the model comprises:
    creating a plurality of classifiers; and
    training each of the plurality of classifiers using a distinct subset of the set of features; and
    using the model to determine that the automobile-network message is anomalous comprises:
    calculating an aggregate classification for the automobile-network message based on a classification of the automobile-network message by each of the plurality of classifiers; and
    determining that the aggregate classification of the automobile-network message indicates that the automobile-network message is anomalous.

4. The computer-implemented method of claim 3, wherein the plurality of classifiers are created and trained using an ensemble machine-learning method.

5. The computer-implemented method of claim 1, further comprising logging, at the first logging device, the first plurality of automobile-network messages as they are broadcast over the first automobile network, wherein the first logging device is connected to the first automobile network via a port of the first automobile network.

6. The computer-implemented method of claim 1, wherein the first, second, and third automobiles are of the same make and model.

7. The computer-implemented method of claim 1, wherein:
creating the model comprises using the set of features to create a model capable of distinguishing automobile-network messages that are part of normal operation of the third automobile from automobile-network messages that are part of an attack on the third automobile network.

8. The computer-implemented method of claim 1, wherein creating the model comprises using the set of features to create a model capable of distinguishing automobile-network messages of functioning electronic control units from automobile-network messages of malfunctioning electronic control units.

9. The computer-implemented method of claim 1, wherein:
the first plurality of automobile-network messages convey a plurality of states of an attribute of the first automobile;
the plurality of states represent a range of possible states of the attribute; and
creating the model comprises using the set of features to create a model capable of distinguishing automobile-network messages that convey states of the attribute that are within the range from automobile-network messages that convey states of the attribute that are outside of the range.

10. The computer-implemented method of claim 1, wherein:
the first plurality of automobile-network messages convey a plurality of states of an attribute of the first automobile while an additional attribute of the first automobile is in a particular state;
the plurality of states represent a range of possible states of the attribute while the additional attribute of the first automobile is in the particular state; and
creating the model comprises using the set of features to create a model capable of distinguishing automobile-network messages that convey states of the attribute that are within the range from automobile-network messages that convey states of the attribute that are outside of the range.

11. The computer-implemented method of claim 1, wherein the first automobile network comprises an in-vehicle controller area network bus.

12. A system for detecting anomalous messages in automobile networks, the system comprising:
a receiving module that:
receives, at a cloud-based computing system from a first logging device of a first automobile, a first plurality of automobile-network messages that were broadcast over a first automobile network of the first automobile by at least one of a first electronic control unit, a first sensor, and a first actuator;
receives, at the cloud-based computing system from a second logging device of a second automobile, a second plurality of automobile-network messages that were broadcast over a second automobile network of the second automobile by at least one of a second electronic control unit, a second sensor, and a second actuator, wherein the second electronic control unit, the second sensor, and the second actuator are respectively substantially similar to the first electronic control unit, the first sensor, and the first actuator, and wherein the second automobile network is substantially similar to the first automobile network;
an extracting module that extracts, at the cloud-based computing system, a set of features from the first plurality of automobile-network messages and the second plurality of automobile-network messages;
a creating module that:
creates, at the cloud-based computing system using the set of features, a model capable of distinguishing expected automobile-network messages broadcast over a third automobile network of a third automobile from anomalous automobile-network messages broadcast over the third automobile network, wherein the third automobile network is substantially similar to the first and second automobile networks; and
transmits, from the cloud-based computing system, the model to the third automobile to enable a security device at the third automobile to detect anomalous automobile-network messages broadcast over the third automobile network;
memory that stores the receiving module, the extracting module, and the creating module; and
at least one processor that executes the receiving module, the extracting module, and the creating module.

13. The system of claim 12, further comprising:
a detecting module, stored in the memory, that detects an automobile-network message that has been broadcast over the third automobile network;
a determining module, stored in the memory, that uses the model to determine that the automobile-network message is anomalous; and
a security module, stored in the memory, that performs a security action in response to determining that the automobile-network message is anomalous.

14. The system of claim 13, wherein:
the creating module creates the model by:
creating a plurality of classifiers; and
training each of the plurality of classifiers using a distinct subset of the set of features; and
the determining module uses the model to determine that the automobile-network message is anomalous by:
calculating an aggregate classification for the automobile-network message based on a classification of the automobile-network message by each of the plurality of classifiers; and
determining that the aggregate classification of the automobile-network message indicates that the automobile-network message is anomalous.

15. The system of claim 12, further comprising:
the first logging device; and
the second logging device.

16. The system of claim 12, wherein the first, second, and third automobiles are of the same make and model.

17. A computer-implemented method for detecting anomalous messages in automobile networks, at least a portion of the method being performed by a computing device comprising at least one processor, the method comprising:
- receiving, at a first automobile from a cloud-based computing system, a model capable of distinguishing expected automobile-network messages broadcast over a first automobile network of the first automobile from anomalous automobile-network messages broadcast over the first automobile network, wherein the cloud-based computing system:
- received, from a first logging device of a second automobile, a first plurality of automobile-network messages that were broadcast over a second automobile network of the second automobile by at least one of a first electronic control unit, a first sensor, and a first actuator;
- received, from a second logging device of a third automobile, a second plurality of automobile-network messages that were broadcast over a third automobile network of the third automobile by at least one of a second electronic control unit, a second sensor, and a second actuator, wherein the second electronic control unit, the second sensor,
- and the second actuator are respectively substantially similar to the first electronic control unit, the first sensor, and the first actuator, and wherein the first, second, and third automobile networks are substantially similar;
- extracted a set of features from the first plurality of automobile-network messages and the second plurality of automobile-network messages;
- created, using the set of features, the model; and
- transmitted the model to the first automobile;
- detecting, at the first automobile, an automobile-network message that has been broadcast over the first automobile network;
- using, at the first automobile, the model to determine that the automobile-network message is anomalous; and
- performing, at the first automobile, a security action in response to determining that the automobile-network message is anomalous.

18. The computer-implemented method of claim 17, wherein the model was created by the cloud-based computing system using an additional set of features extracted from a third plurality of automobile-network messages that were previously broadcast over the first automobile network.

19. The computer-implemented method of claim 18, further comprising:
- logging the third plurality of automobile-network messages as they are broadcast over the first automobile network; and
- transmitting information about the third plurality of automobile-network messages to the cloud-based computing system.

20. The computer-implemented method of claim 18, wherein the steps of receiving, detecting, using, and performing are performed by at least one of:
- an electronic control unit connected to the first automobile network; and
- a third logging device connected to the first automobile network via a port of the first automobile network.

* * * * *